US012344322B2

(12) United States Patent
Kumar

(10) Patent No.: US 12,344,322 B2
(45) Date of Patent: Jul. 1, 2025

(54) VEHICLE FLOORING SYSTEM WITH ROLLERS

(71) Applicant: Anjani Kumar, Northville, MI (US)

(72) Inventor: Anjani Kumar, Northville, MI (US)

( * ) Notice: Subject to any disclaimer, the term of this patent is extended or adjusted under 35 U.S.C. 154(b) by 386 days.

(21) Appl. No.: 17/658,315

(22) Filed: Apr. 7, 2022

(65) Prior Publication Data

US 2022/0324521 A1 Oct. 13, 2022

Related U.S. Application Data

(60) Provisional application No. 63/171,878, filed on Apr. 7, 2021.

(51) Int. Cl.
*B62D 25/20* (2006.01)
*B60N 2/07* (2006.01)
*B60P 1/52* (2006.01)

(52) U.S. Cl.
CPC ............ *B62D 25/2054* (2013.01); *B60P 1/52* (2013.01); *B60N 2/07* (2013.01)

(58) Field of Classification Search
CPC ........ B60P 1/52; B60P 7/0815; B62D 29/005; B62D 25/2054; B62D 25/20; B60N 2/07; B60N 2/06
USPC ...................................................... 296/184.1
See application file for complete search history.

(56) References Cited

U.S. PATENT DOCUMENTS

| | | |
|---|---|---|
| 5,026,225 A | 6/1991 | McIntyre |
| 5,827,022 A | 10/1998 | Tovani |
| 6,427,962 B1 * | 8/2002 | Rohee ................. B60N 2/0705 248/424 |
| 6,595,142 B2 | 7/2003 | Christensen |
| 7,021,012 B2 | 4/2006 | Zeng et al. |

(Continued)

FOREIGN PATENT DOCUMENTS

| | | |
|---|---|---|
| EP | 1495946 A2 | 1/2005 |
| EP | 1688298 A1 | 8/2006 |

(Continued)

OTHER PUBLICATIONS

KieTekint, YouTube Video—About Kietek Retrieved from the Internet: https://www.youtube.com/watch?v=_4_vXL9ncBs, 3 pages, Dec. 11, 2012.

(Continued)

*Primary Examiner* — Gregory A Blankenship
(74) *Attorney, Agent, or Firm* — Woodard, Emhardt, Henry, Reeves & Wagner, LLP

(57) ABSTRACT

A vehicle flooring system configured to enable movement of cargo within a vehicle. The flooring system is made up of individual flooring panels connected via a snap fit type connection. In one embodiment, the flooring panels define one or more openings/slots configured to receive and secure one or more rollers. The rollers are configured to enable slidable movement of cargo within the vehicle. In another embodiment, the flooring panels include one or more lightweight panels and one or more reinforced panels. In one example, the reinforced panels are metal, such as extruded aluminum. In another example, the lightweight panels are a polymeric material, such as extruded plastic. The flooring system is further configured to satisfy government regulations concerning pull testing.

11 Claims, 19 Drawing Sheets

(56) References Cited

U.S. PATENT DOCUMENTS

| | | | | |
|---|---|---|---|---|
| 7,350,853 | B2* | 4/2008 | Fitze | B62D 29/005 410/104 |
| 7,556,463 | B1 | 7/2009 | Hall | |
| 8,640,418 | B2 | 2/2014 | Paetrow et al. | |
| 2009/0028658 | A1* | 1/2009 | Adams | B62D 21/20 410/104 |
| 2013/0250594 | A1* | 9/2013 | Baldsiefen | B60Q 3/30 362/496 |
| 2013/0257094 | A1* | 10/2013 | McCloud | B60P 7/0815 296/184.1 |
| 2014/0248103 | A1 | 9/2014 | Baldsiefen et al. | |
| 2014/0345221 | A1* | 11/2014 | Stanchfield | E04F 13/076 52/390 |
| 2015/0353138 | A1* | 12/2015 | Fenton | B62D 25/02 296/186.1 |
| 2018/0327180 | A1* | 11/2018 | He | B65D 90/12 |
| 2020/0155386 | A1* | 5/2020 | Kumar | B62D 25/2054 |
| 2021/0179189 | A1* | 6/2021 | Noh | B62D 25/20 |
| 2022/0144159 | A1* | 5/2022 | Smith | B62D 25/2054 |
| 2022/0324521 | A1* | 10/2022 | Kumar | B62D 25/2054 |
| 2023/0201051 | A1* | 6/2023 | Kumar | B62D 25/2054 296/193.07 |
| 2023/0373568 | A1* | 11/2023 | Hansen | B62D 25/20 |
| 2024/0199139 | A1* | 6/2024 | Kline | B62D 25/2054 |

FOREIGN PATENT DOCUMENTS

| | | | |
|---|---|---|---|
| EP | 2570104 A1 | | 3/2013 |
| EP | 3081432 A1 | | 10/2016 |
| GB | 2427176 A | | 6/2006 |
| KR | 2001-0069927 | * | 7/2001 ................ B60P 1/52 |

OTHER PUBLICATIONS

Larry Phelps, YouTube—Move Regular Wood Pallets in your Sprinter Van! Retrieved from the Internet: https://www.youtube.com/watch?v=wfvkLtPOPKc, 4 pages, Aug. 7, 2013.

Joloda Hydraroll Ltd, YouTube Video—Joloda Hydraroll Container Loading System—in use Retrieved from the Internet: https://www.youtube.com/watch?v=Vc6x8454iTo, 4 pages, May 13, 2014.

LiveLikePete, Sprinter Van Floor Project Retrieved from the Internet: https://livelikepete.com/sprinter-van-floor-project/, 18 pages, Dec. 27, 2017.

Legend Global, YouTube Video—How to Install StabiliGrip Van Floor with Rail Joint Retrieved from the Internet: https://www.youtube.com/watch?v=UOtXZWwbOaY, 4 pages, Jul. 10, 2018.

Schnierle Seating Systems, Aluminum System Floor M1 and M2 Retrieved from the Internet: https://www.schnierle.de/aluminum-floorsystem-m1-and-m2-en.html, 2 pages, Oct. 8, 2019.

NMI Safety Systems, Floor Tracking and Accessories Retrieved from the Internet: https://www.nmisafety.com/product-category/seat-fitting-lockables-in-floor-track/floor-tracking-accessories/, 5 pages, Oct. 8, 2019.

BraunAbility, Innotrax Bespoke Aluminum Flooring for Vehicles Retrieved from the Internet: https://www.braunability.eu/en/products/flooring-and-seating/innotrax/, 2 pages, Oct. 8, 2019.

AMF-Bruns, Smartfloor Aluminium Floor Solution Retrieved from the Internet: https://www.amf-bruns-mobility.com/products/smart floor/, 1 page, Oct. 8, 2019.

Joloda Hydraroll Ltd, YouTube Video—Joloda Hydraroll Tuck loading—Pneumatic Rollertrack Retrieved from the Internet: https://www.youtube.com/watch?v=zkS8b-cyFpo, 4 pages, Nov. 4, 2020.

Ranger Design, Installation Guide 6540-FTL Floor Ford Transit 148 Inch Wheelbase, 21 pages, Jun. 2, 2022.

Ranger Design, Ranger Design Website—Ford Transit 148 Inch WB Floor-6540-FTL Retrieved from the Internet: https://rangerdesign.com/products/ford-transit-148-wb-floor-6540-ftl/, 3 pages, Jun. 2, 2022.

U.S. Upfitters, Stabiligrip Floor for Mercedes Sprinter Vans Retrieved from the Internet: https://www.inlad.com/product/stabiligrip-floor-for-mercedes-sprinter-vans/, 9 pages, Jun. 2, 2022.

* cited by examiner

VEHICLE FLOORING SYSTEM WITH ROLLERS

CROSS REFERENCE TO RELATED APPLICATIONS

This application claims the benefit of U.S. Patent Application No. 63/171,878, filed Apr. 7, 2021, which is hereby incorporated by reference.

BACKGROUND

Vehicles, such as cargo vans, trucks, and/or tractor-trailers are often used to transport cargo. In one example, vehicles are used to transport cargo stacked on pallets. On such vehicles the pallets are generally loaded into the vehicle from the back. However, after the pallets are placed in the vehicle, further movement of the pallets is difficult due to the weight of the pallet. Additionally, during unloading, pallets positioned towards a passenger cabin of the vehicle are unable to be reached by a fork truck, which makes removing the pallets a difficult and time-consuming process.

Thus, there is a need for improvement in this field.

SUMMARY

A unique vehicle flooring system configured to enable a user to easily slide one or more pallets and/or other cargo within a vehicle such as a van. The flooring system is configured to allow floor panels made from different material to be readily connected together. This in turn allows different types of panels be used in the same flooring system. For instance, certain panels may be used in areas of the floor that do not require significant strength, and stronger floor panels may be used where seats or other safety critical structures are secured to the flooring system. In one version, the flooring system includes one or more reinforced floor panels and one or more light weight floor panels. In one example, the reinforced floor panels are made from metal. In another example, the reinforced floor panels area made from aluminum. In yet another example, the light weight floor panels are made from plastic. The flooring system is assembled using a unique snap-fit connection that allows floor panels made from different materials to be connected together. In other words, the snap-fit is configured to enable a modular flooring system where different panel material combinations can be used. As should be appreciated, a combination of light weight and reinforced floor panels can be implemented as desired by a user to save weight and/or increase strength of the flooring system as well as reduce overall cost.

The lightweight panels include one or more retention arms that are configured to connect or hook onto an adjacent panel. The adjacent panel can be made of the same material as the lightweight panel (e.g., plastic) or different material (e.g., aluminum) as the lightweight panel. At the connection, the retention arms extend at an acute angle relative to one or more connector arms of the lightweight panel. By extending at an acute angle, the retention arms are able to deflect to a greater extent and/or be more flexible so as to accommodate different panels and engagement configurations. In one version, the retention arms extend at an acute angle from a corner that is formed between a connector guide of the lightweight panel and a main end wall of the lightweight panel. In other words, the retention arms generally bisect the rectangular cavity formed between the connector guide and the end wall of the lightweight panel so as to form generally triangular areas where the retention arms are able to flex. The retention arms in one form are configured to hook onto the receptacle tongues of the adjacent panel so as to connect the panels together.

As compared to the connector guide of the reinforced floor panel, side guide walls of the connector guide are spaced closer together so as to provide additional room for the retention arms to flex. In order for a guide end wall of the connector guide in the lightweight panel to have a comparable size as those found on the connector guide of the reinforced panel, the guide end wall of the lightweight panel has flanges that are configured to receive the retention arms when flexed. This configuration ensures a secure connection when the lightweight floor panel is secured to a reinforced floor panel.

In another example, the floor panels include one or more openings configured to receive one or more transfer rollers. The transfer rollers are configured to mount within the openings on both the light weight and the reinforced floor panels. The rollers are configured to enable a user to easily move cargo, such as pallets around within the vehicle. In one example, the rollers are in the form of ball rollers, and in another example, the rollers are in the form of cylindrical rollers. In some embodiments, the flooring system is raised above a floor of the vehicle. For example, the flooring system is raised at least six (6) inches above the surface of the vehicle floor. As should be appreciated, a gap formed between the flooring system and the vehicle floor enables a user to store items and/or cargo underneath the flooring system.

In one version, the flooring system includes one or more aluminum floor panels that have one or more track channels where seats or other structures are secured. The aluminum panels are connected to one or more plastic panels that lack the track channels. The plastic panels can form a walking area and/or an area where cargo can be slid. Alternatively or additionally, some or all of the panels incorporate that the transfer rollers configured to move the cargo. The plastic panels are typically lighter than the aluminum panels which reduces the overall weight of the flooring system.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a vehicle flooring system.

Aspect 3 generally concerns the system of any previous aspect in which the flooring system includes one or more vehicle floor panels with a snap-fit connection between the floor panels.

Aspect 4 generally concerns the system of any previous aspect in which the snap-fit connection extends for the full length of the floor panels.

Aspect 5 generally concerns the system of any previous aspect in which the floor panels have a track that defines a channel.

Aspect 6 generally concerns the system of any previous aspect in which the channel is integral with the floor panel.

Aspect 7 generally concerns the system of any previous aspect in which the reinforced floor panels are configured to secure one or more seats via the channel.

Aspect 8 generally concerns the system of any previous aspect in which the snap-fit connection is configured to connect the floor panels together when the floor panels are pushed together in a linear direction.

Aspect 9 generally concerns the system of any previous aspect in which the floor panels include a cargo surface spaced apart from a support surface via one or more ribs.

Aspect 10 generally concerns the system of any previous aspect in which the cargo surface, support surface, and ribs combine to form one or more panel cavities within the floor panels.

Aspect 11 generally concerns the system of any previous aspect in which the one or more rollers are secured within the panel cavities via one or more slots in the cargo surface.

Aspect 12 generally concerns the system of any previous aspect in which the rollers are secured within the panel cavities via a friction-fit.

Aspect 13 generally concerns the system of any previous aspect in which the lightweight panels include one or more ridges on the cargo surface configured to increase grip on the cargo surface.

Aspect 14 generally concerns the system of any previous aspect in which the floor panels are extruded.

Aspect 15 generally concerns the system of any previous aspect in which the flooring system includes a combination of reinforced floor panels and lightweight floor panels.

Aspect 16 generally concerns the system of any previous aspect in which the reinforced floor panels are made of aluminum.

Aspect 17 generally concerns the system of any previous aspect in which the reinforced floor panels and lightweight floor panels are configured to secure together via a snap-fit connection.

Aspect 18 generally concerns the system of any previous aspect in which the lightweight floor panels are made of plastic.

Aspect 19 generally concerns the system of any previous aspect in which the flooring system is elevated above a vehicle floor by at least six (6) inches.

Aspect 20 generally concerns the system of any previous aspect in which the flooring system is secured to a vehicle floor via one or more fasteners through the support surface of the floor panels at only one end of the floor panels.

Aspect 22 generally concerns a system that includes a one or more floor panels.

Aspect 23 generally concerns a system in which the floor panels include lightweight floor panels.

Aspect 24 generally concerns a system in which the floor panels include reinforced floor panels.

Aspect 25 generally concerns a system that includes a first floor panel.

Aspect 26 generally concerns a system that includes a second floor panel.

Aspect 27 generally concerns a system in which the first floor panel and the second floor panel are made from different materials.

Aspect 28 generally concerns a system that in which the first floor panel and the second floor panel connected together.

Aspect 29 generally concerns a system that includes a floor panel defines a panel cavity within the floor panel.

Aspect 30 generally concerns a system that includes a roller is secured within the panel cavity via an opening in the floor panel.

Aspect 31 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
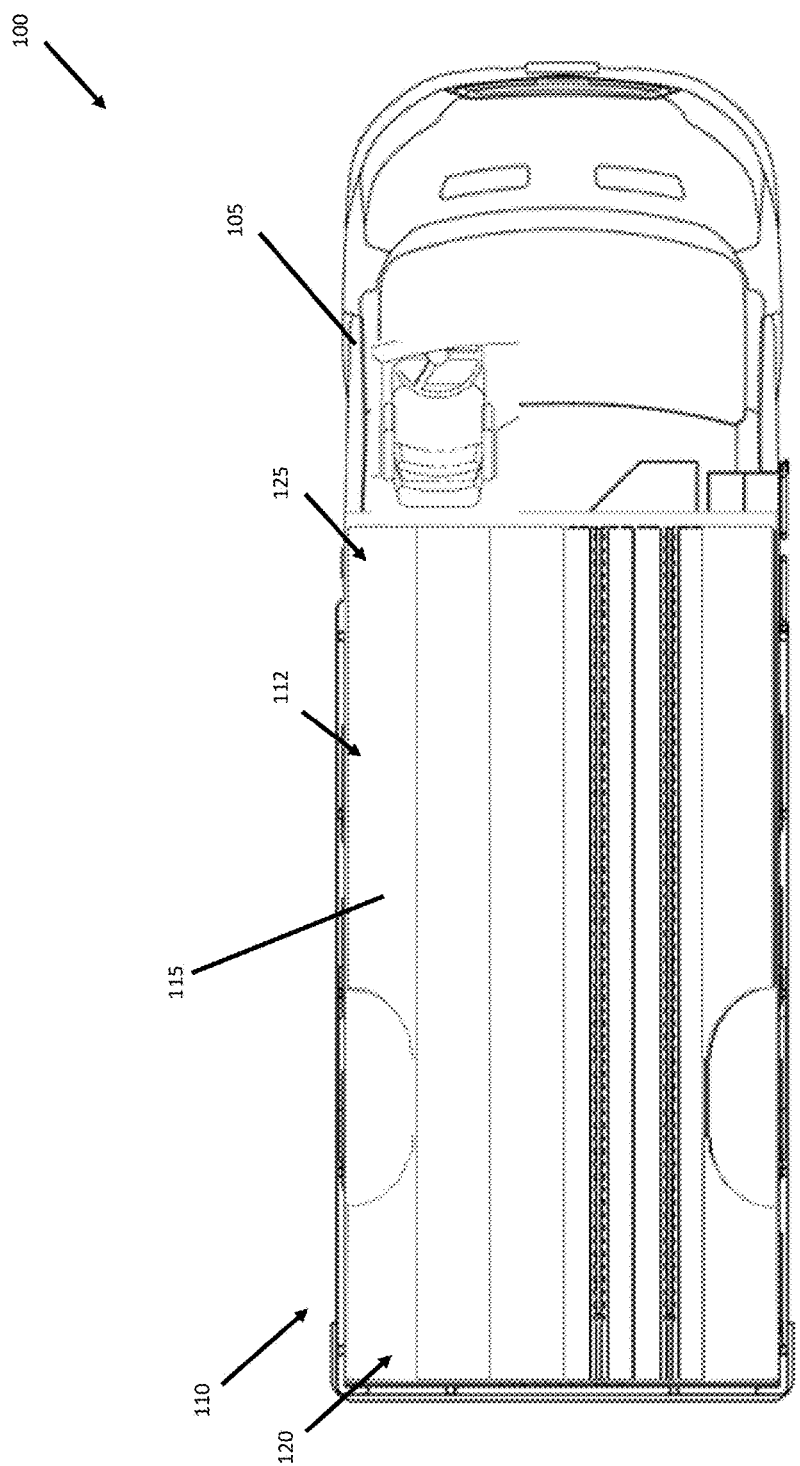
FIG. 1 is a diagrammatic view of a vehicle including a flooring system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Figure 2:
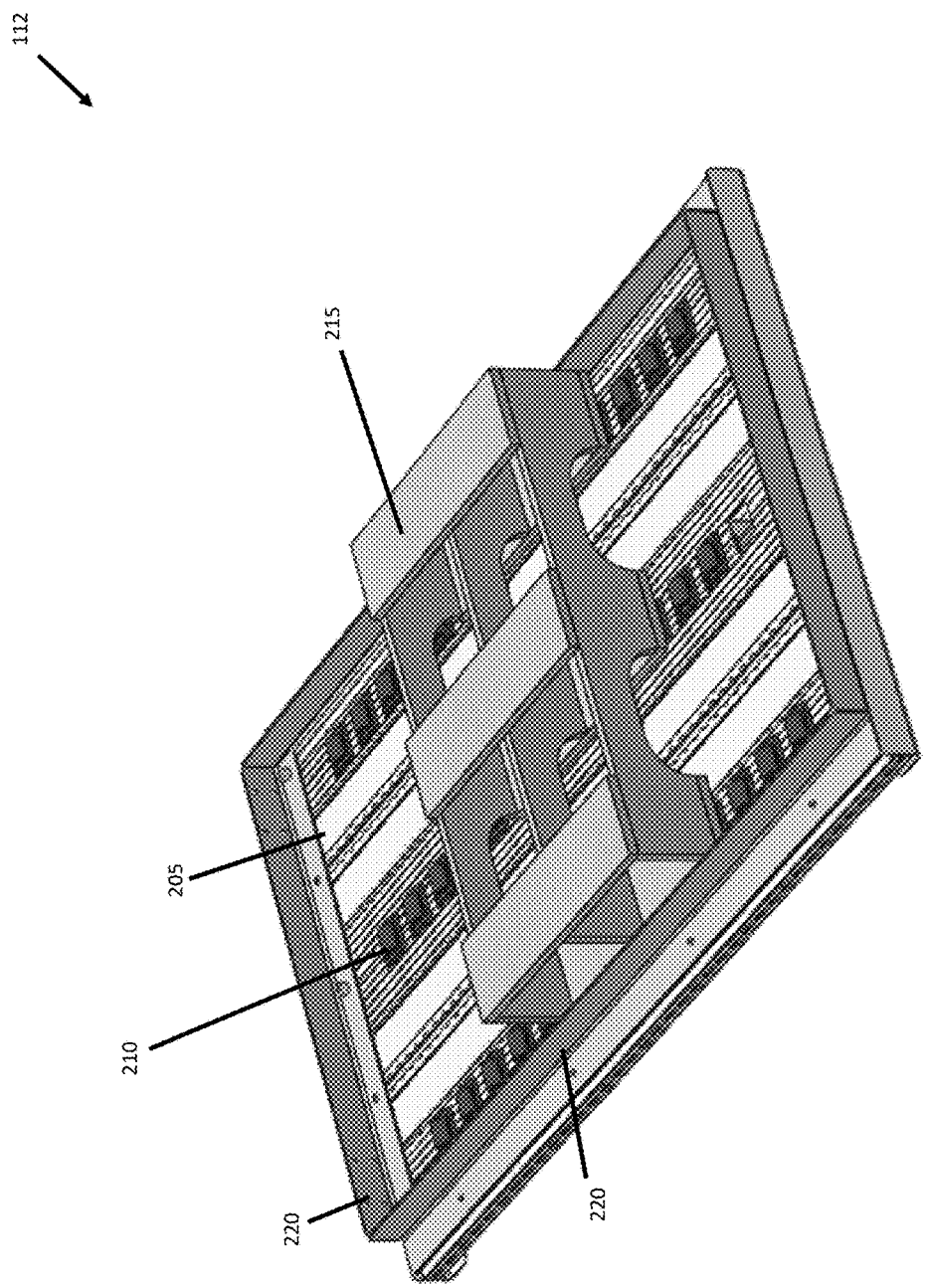
FIG. 2 is a perspective view of the flooring system of FIG. 1.
Figure 3:
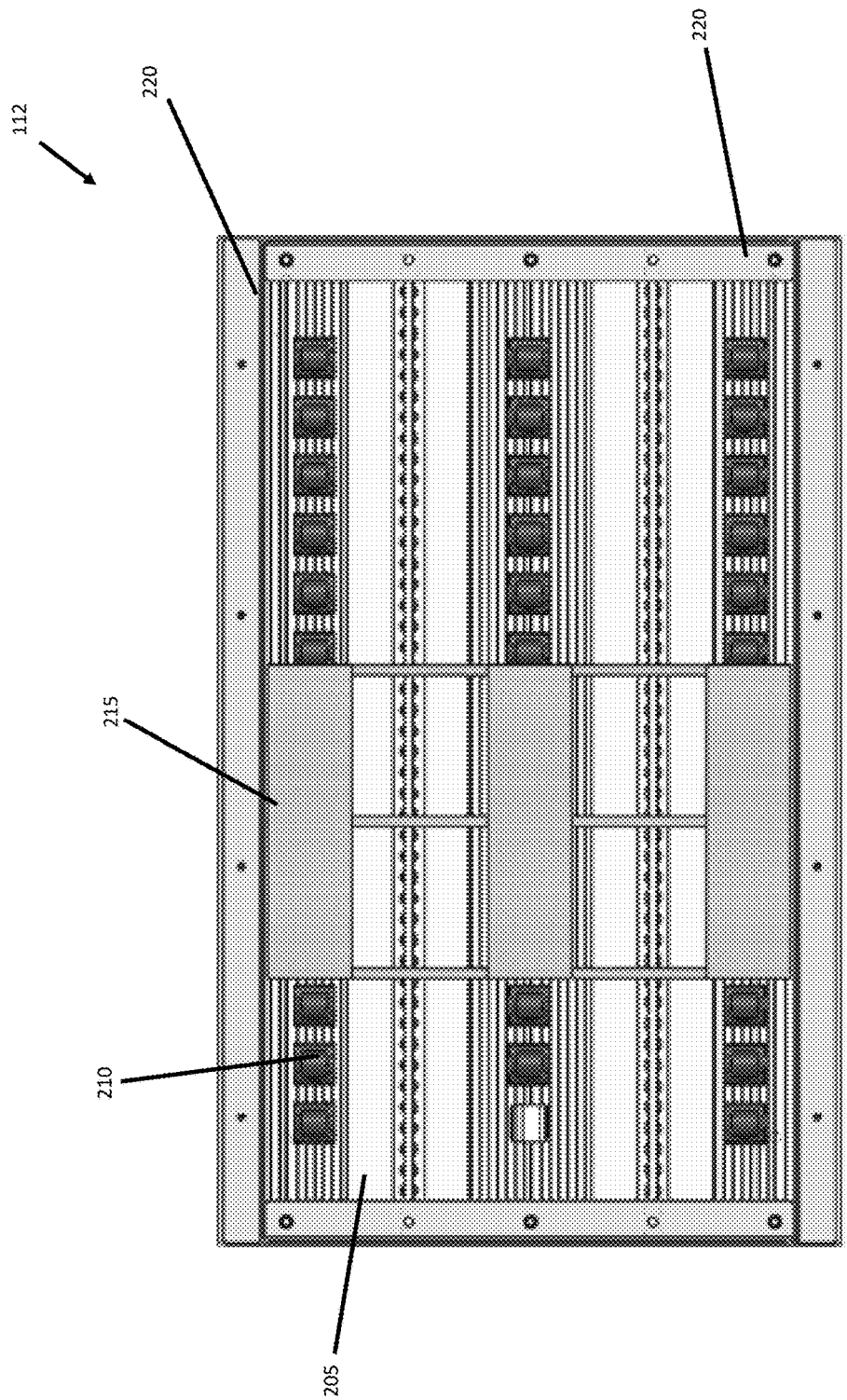
FIG. 3 is a top view of the flooring system of FIG. 1.

As shown in FIG. 1, a vehicle 100 in one example has a passenger cabin 105 and a cargo area 110. The vehicle 100 further includes a flooring system 112 within the cargo area 110 that is attached to an existing vehicle floor. The flooring system 112 includes a floor 115 made up of one or more floor panels. As can be seen, the flooring system 112 has a first end 120 and a second end 125. The flooring system 112 is secured to the vehicle floor with one or more fasteners (shown in FIG. 5), such as bolts attached at only one end. For example, the flooring system 112 is secured to the vehicle floor at either the first end 120 or the second end 125 this configuration creates a "floating floor" which increases ease/speed of installation. In other examples, the flooring system 112 is secured to the vehicle floor at both the first end 120 and the second end 125. As will be explained in further detail below, the flooring system 112 includes a unique snap fit connection that extends for the full length of the flooring system 112.

As shown in FIGS. 2, 3, 4, 5, and 6, the flooring system 112 of the vehicle 100 includes one or more floor panels 205. The floor panels 205 are connected together via a snap-fit connection. The snap-fit connection extends for the full length of the floor panels 205 so that the floor panels 205 remain firmly connected together even during governmental safety tests. The floor panels 205 further include one or more rollers 210 configured to enable a user to easily move around a cargo 215. For example, the rollers 210 are configured to enable a user to place cargo 215, such as a pallet, onto the flooring system 112 and move the cargo 215 into a desired location without the use of machinery. The flooring system 112 further includes a retention assembly 220 configured to retain the cargo 215 within the flooring system 112. For example, the retention assembly 220 is configured to prevent the cargo 215 from sliding around on the flooring system 112 when the vehicle 100 is in motion.

Figure 4:
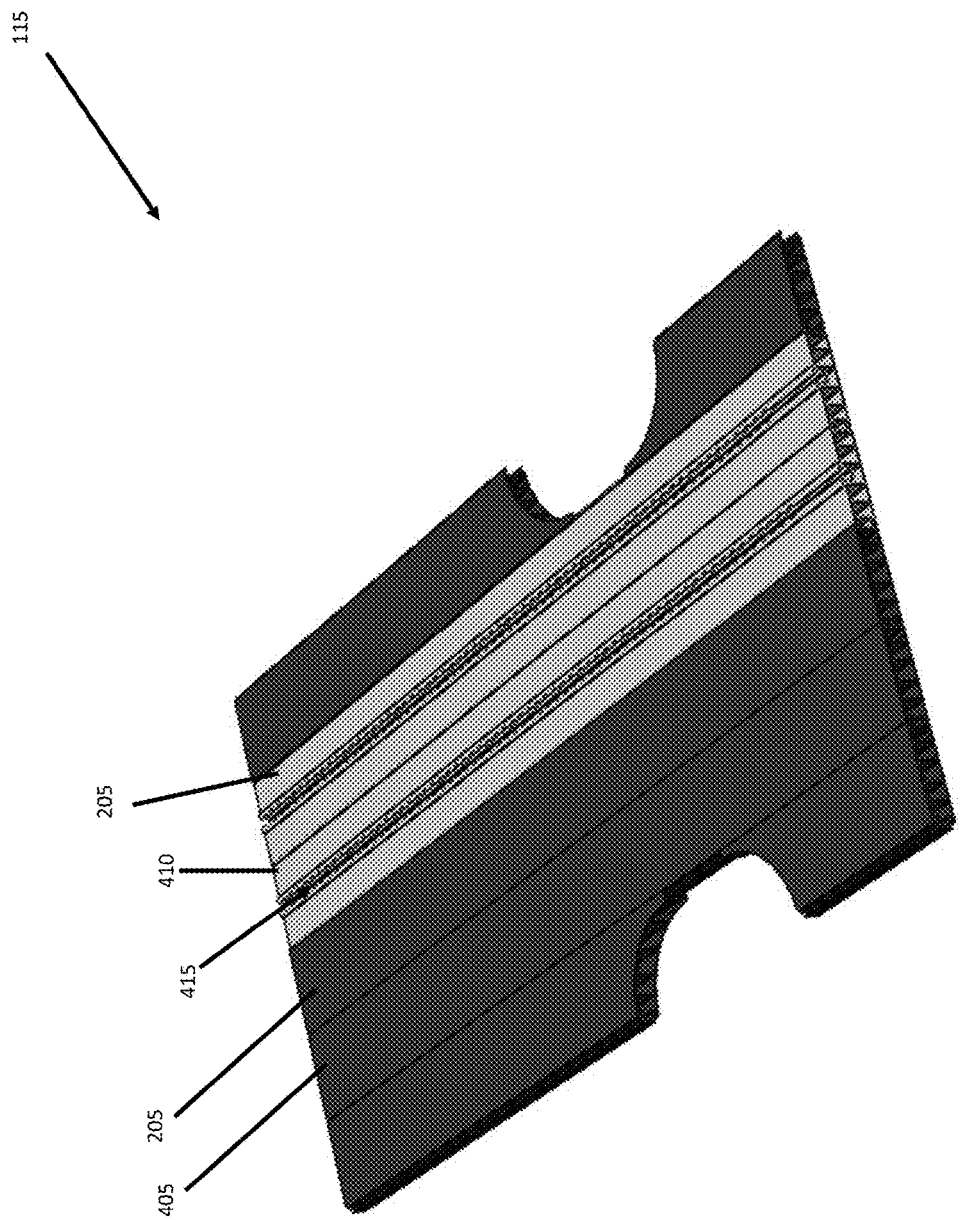
FIG. 4 is a perspective view of a floor of the flooring system of FIG. 1.
Figure 5:
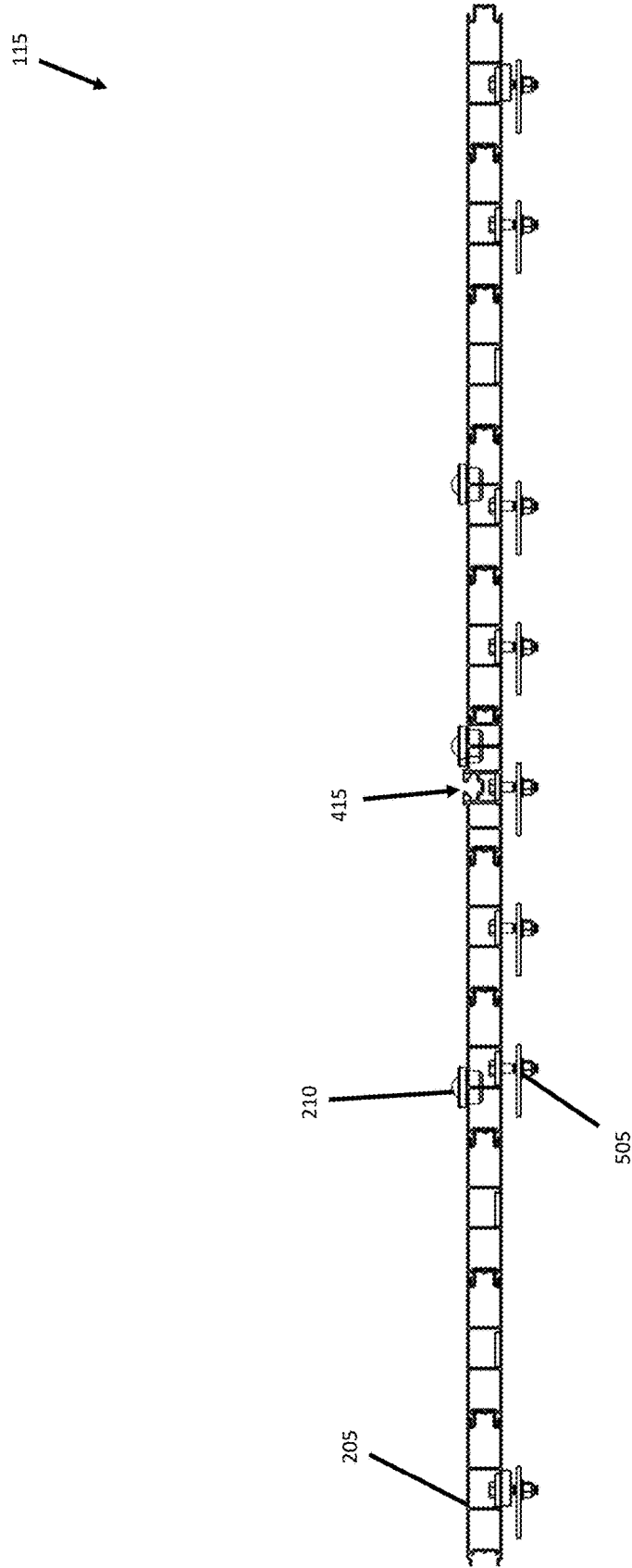
FIG. 5 is an enlarged end view of the floor of FIG. 4.

As can be seen in FIG. 4, the floor 115 is made of one or more lightweight panels 405 and/or one or more reinforced panels 410. The lightweight panels 405 are configured to connect to the reinforced panels 410 via the snap-fit connection discussed previously. However, the lightweight panels 405 are lighter weight than the reinforced panels 410 to reduce overall weight of the floor 115. As should be appreciated, the lightweight panels 405 reduce fuel consumption of the vehicle 100, thus saving costs. The reinforced panels 410 define one or more track channels 415 to which seats, wheelchairs, and/or other support structures are secured. In one example, the lightweight panels 405 are made from a lightweight material, such as plastic, carbon fiber, a polymeric material, and/or any other suitably lightweight material. In another example, the reinforced panels 410 are made from metal, such as aluminum, steel, and/or any other metallic material. As seen in FIG. 5, the floor 115 includes one or more fasteners 505 configured to secure the floor 115 to the vehicle floor. As mentioned previously, in one example, the floor 115 is secured to the vehicle floor at only one end, such as the first end 120 and/or the second end 125.

Figure 6:
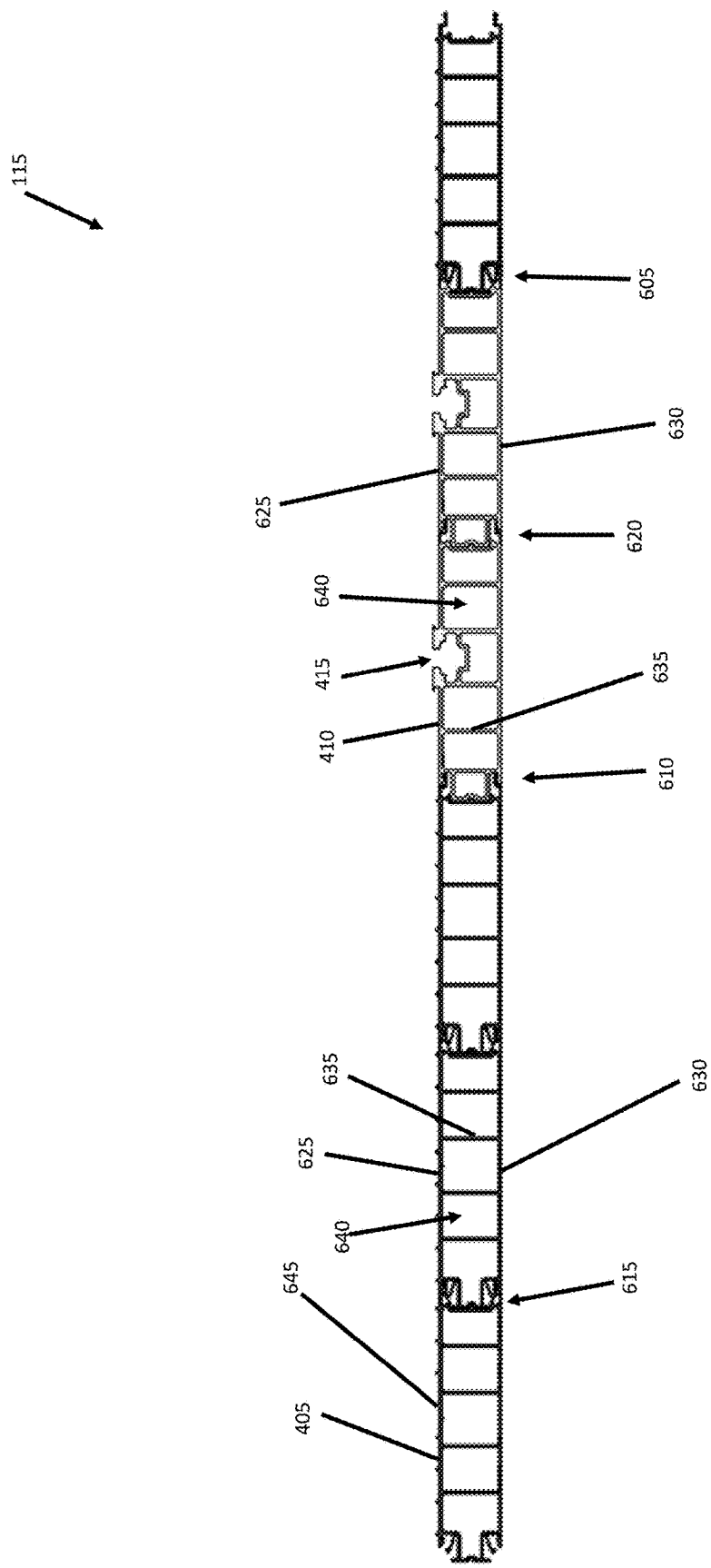
FIG. 6 is an enlarged end view of the floor of FIG. 4.

The connection of the floor panels 205 of the floor 115 via the snap-fit connection is depicted in FIG. 6. As shown, the floor panels 205 include the lightweight panels 405 and the reinforced panels 410. As can be seen, the lightweight panels 405 and the reinforced panels 410 are interchangeable within the flooring system 112 based on the needs of a user. Again, the snap-fit connection extends for the entire length of the floor panels 205 so as to provide a secure connection between the floor panels 205. This is accomplished by manufacturing the floor panels 205 through an extrusion process. Thus, in one example, the lightweight panels 405 are made from extruded plastic and the reinforced panels 410 are made from extruded aluminum. As can be seen in FIG. 6, the snap-fit connections between the floor panels 205 are different depending on the type of the floor panels 205. For example, a first snap-fit 605 between the lightweight panels 405 and the reinforced panels 410, a second snap-fit 610 between the lightweight panels 405 and the reinforced panels 410, a third snap-fit 615 between the lightweight panels 405, and a fourth snap-fit 620 between the reinforced panels 410. As can be seen, the lightweight panels 405 snap-fit to both other lightweight panels 405 and the reinforced panels 410 and the reinforced panels 410 snap-fit to both other reinforced panels 410 and the lightweight panels 405. As should be appreciated, this enables a modular flooring system 112, which can be readily adapted to suit the needs of a user.

The floor 115 includes a cargo surface 625 configured to face towards and/or support cargo loaded onto the floor 115. Spaced away from the cargo surface 625 is a support surface 630. The support surface 630 is configured to face towards the vehicle floor, opposite the cargo surface 625. The fasteners 505 (shown in FIG. 5) are configured to extend through the support surface 630, but not through the cargo surface 625 when the floor 115 is secured to the vehicle floor. Between the cargo surface 625 and the support surface 630 are one or more ribs 635. The ribs 635 are configured to support the cargo surface 625 and the support surface 630. The ribs 635 also work to distribute the load on the cargo surface 625. This distribution allows for the flooring system 112 to withstand strong forces in the event of a collision. Additionally, the distribution enables the floor 115 to be elevated above a vehicle floor. In one example, the floor 115 is elevated above the vehicle floor by at least six (6) inches. In another example, the floor 115 is elevated above the vehicle floor by twelve (12) inches. As should be appreciated, elevating the floor 115 enables a user to store items and/or equipment underneath the floor 115 without losing the functionality of the flooring system 112.

The ribs 635 create one or more panel cavities 640. The panel cavities 640 serve to reduce the manufacturing costs and weight of the flooring system 112 by reducing the amount of material needed to extrude the floor panels 205. Additionally, the panel cavities 640 serve as mounting locations and/or receptacles for the rollers 210. The lightweight panels 405 further include one or more ridges 645. The ridges 645 are configured to provide a grip surface to a user to prevent slipping and/or unwanted sliding of cargo. In other example, the reinforced panels 410 also include ridges 645. However, in most embodiments, the reinforced panels 410 do not include ridges 645 and the lightweight panels 405 do include ridges 645.

Figure 7:
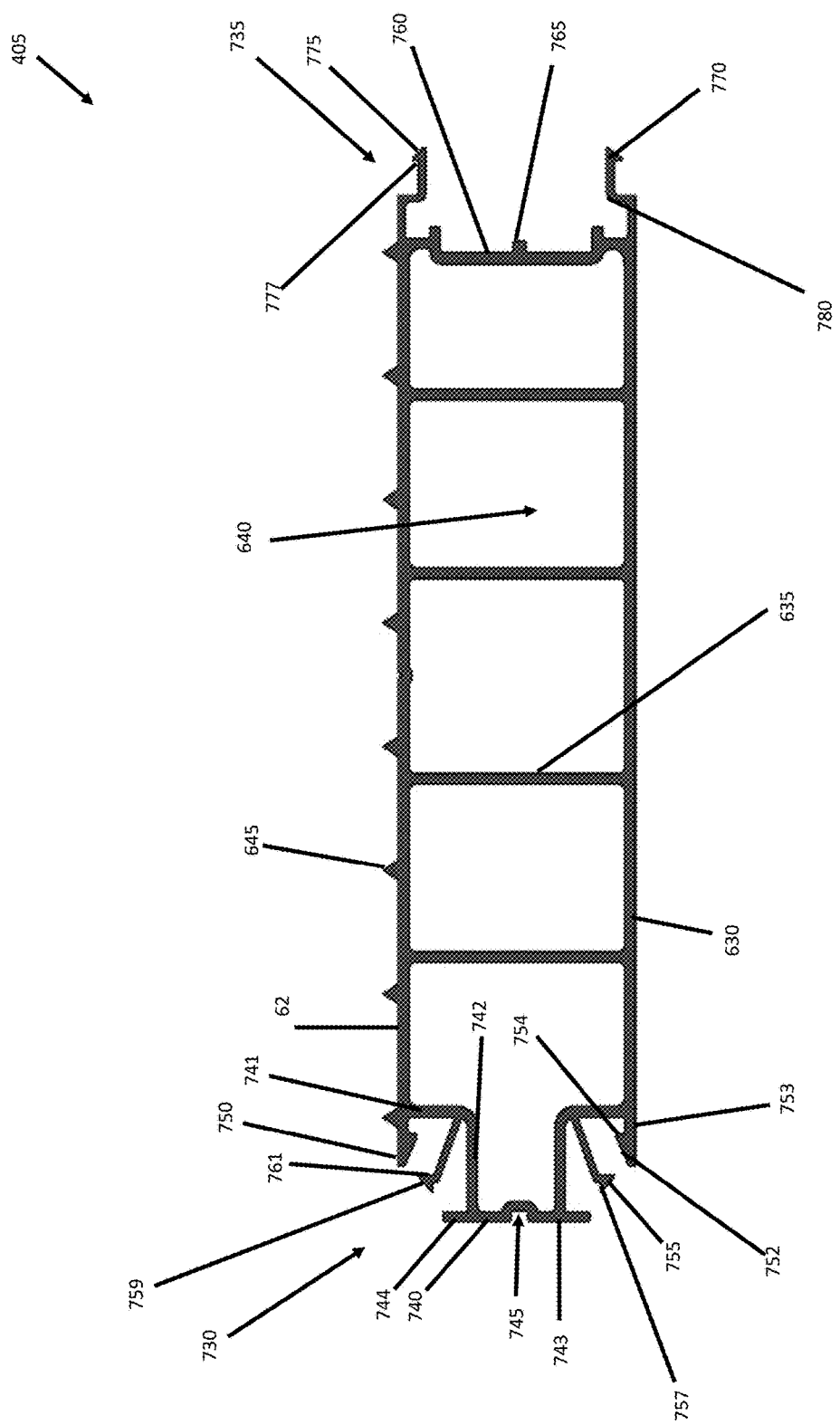
FIG. 7 is an enlarged end view of a lightweight panel of the flooring system.

Turning to FIG. 7, each of the lightweight panels 405 includes a male portion 730 and a female portion 735. The male portion 730 includes a connector guide 740 configured to align the lightweight panel 405 with an adjacent floor panel 205 when connected. The connector guide 740 extends from a panel end wall 741 of the lightweight panels 405. The connector guide 740 has opposing side guide walls 742 that extend from the panel end wall 741. Opposite the panel end wall 741, the connector guide 740 has an end guide wall 743 configured to engage the adjacent floor panel 205. The end guide wall 743 is similarly sized as ones found on the reinforced panels 410, but the side guide walls 742 are spaced closer together as compared to those found on the reinforced panels 410. To facilitate this construction, the end guide wall 743 has opposing flanges 744. The end guide wall 743 of the connector guide 740 further defines a connector groove 745.

The male portion 730 includes one or more connector arms 750. The connector arms 750 include an angled surface 752 and a connector protrusion 754. As shown, the male portion 730 has one or more retention arms 755 configured to connect to the adjacent floor panel 205. The retention arms 755 have a retention arm head 757 with a retention arm sloped edge 759 and a retention arm locking ledge 761. The retention arms 755 extends outward at an acute angle from the end guide wall 743. As shown, each of the retention arms 755 form an acute angle relative to the side guide wall 742. The retention arms 755 extend at an acute angle from the corner where the panel end wall 741 and the side guide walls 742 meet. In other words, the retention arms 755 generally bisect the generally rectangular cavity formed between connector guide 740 and the panel end wall 741 so as to form generally triangular areas where the retention arms 755 are able to deflect. By extending at an acute angle, the retention arms 755 are able to deflect to a greater extent and/or be more flexible so as to accommodate different floor panels 205 and engagement configurations. With the connector guide 740 having the flanges 744 that allow the side guide walls 742 of the connector guide 740 to be narrower, the retention arms 755 are able to flex to a greater extent so as to accommodate different types of floor panels 205. In one form, the retention arms 755 are configured to flex inward when connecting to the adjacent floor panel 205.

The female portion 735 includes one or more guide end tongues 770 and a guide end wall 760. The guide end tongues 770 further include a tongue chamfer 775, a tongue locking member 777, and a tongue locking bend 780. The guide end wall 760 further includes a guide end post 765.

Figure 8:
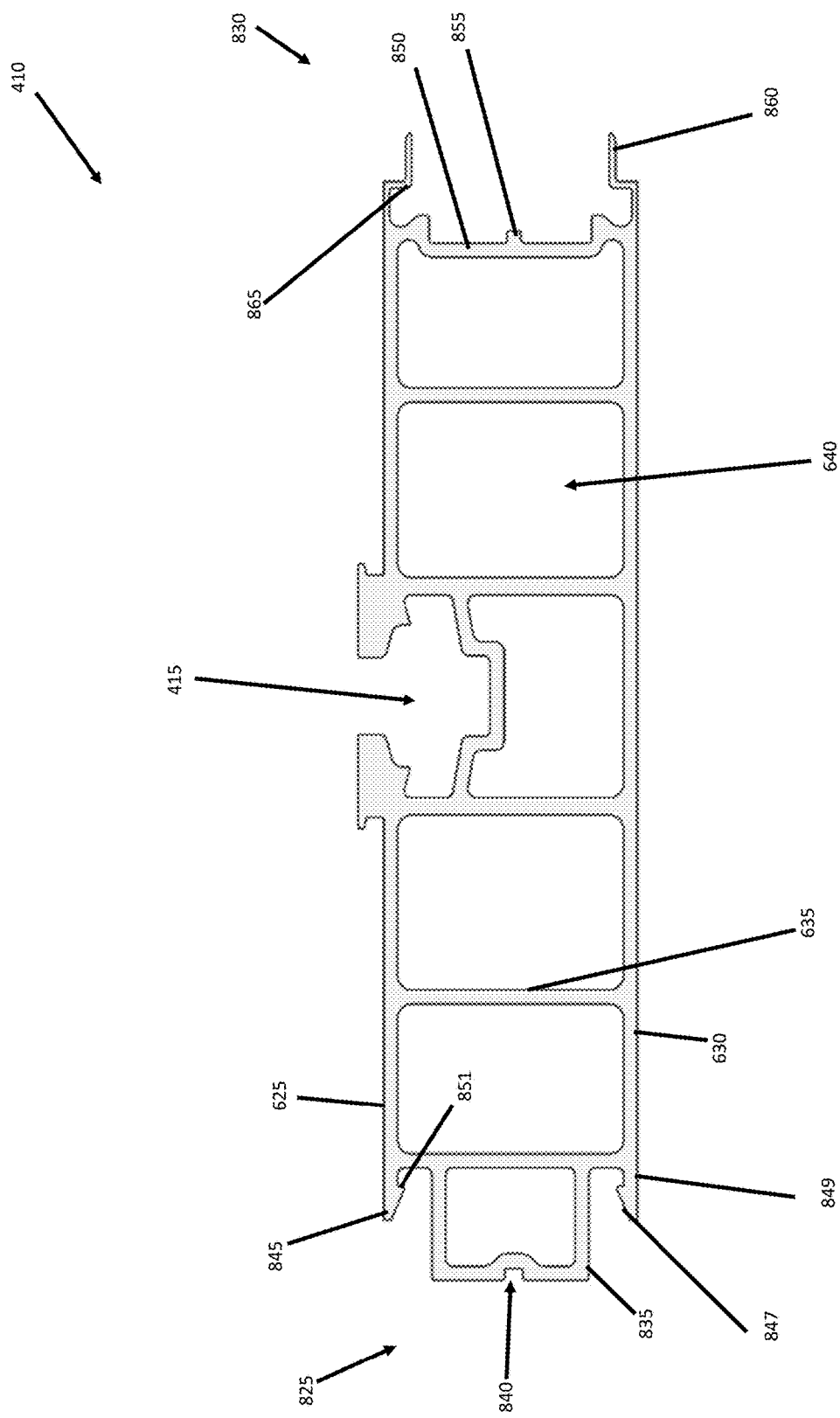
FIG. 8 is an enlarged end view of a reinforced panel of the flooring system.

Turning to FIG. 8, the reinforced panels 410 include a male portion 825 and a female portion 830. The male portion 825 includes one or more alignment arms 845 and an alignment guide 835. The alignment arms 845 further include a beveled edge 847, a locking lip 851, and an alignment arm flex groove 849. The alignment guide 835 further includes an alignment groove 840.

The female portion 830 includes one or more receptacle tongues 860 and a receptacle wall 850. The receptacle tongues 860 further include a receptacle locking bend 865. The receptacle wall 850 further includes a receptacle post 855.

Figure 9:
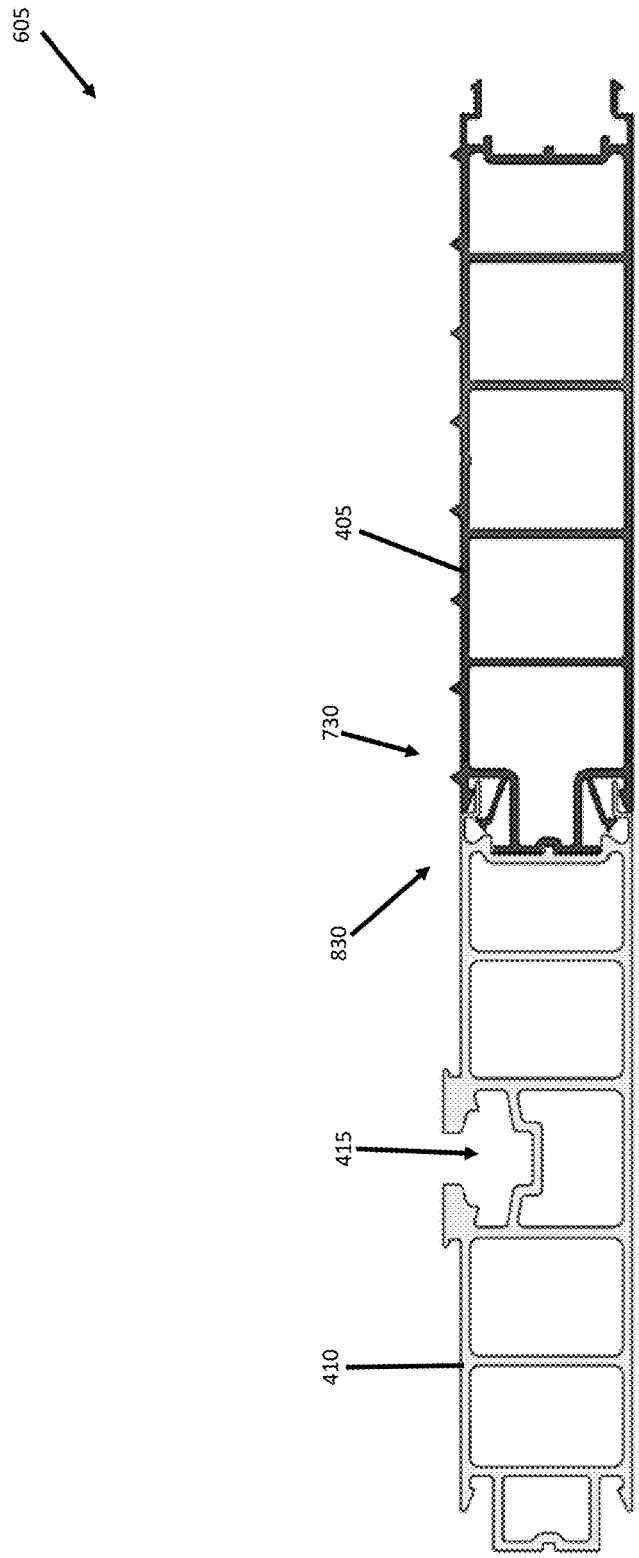
FIG. 9 is an enlarged end view of a first snap-fit between the lightweight panels and the reinforced panels.
Figure 10:
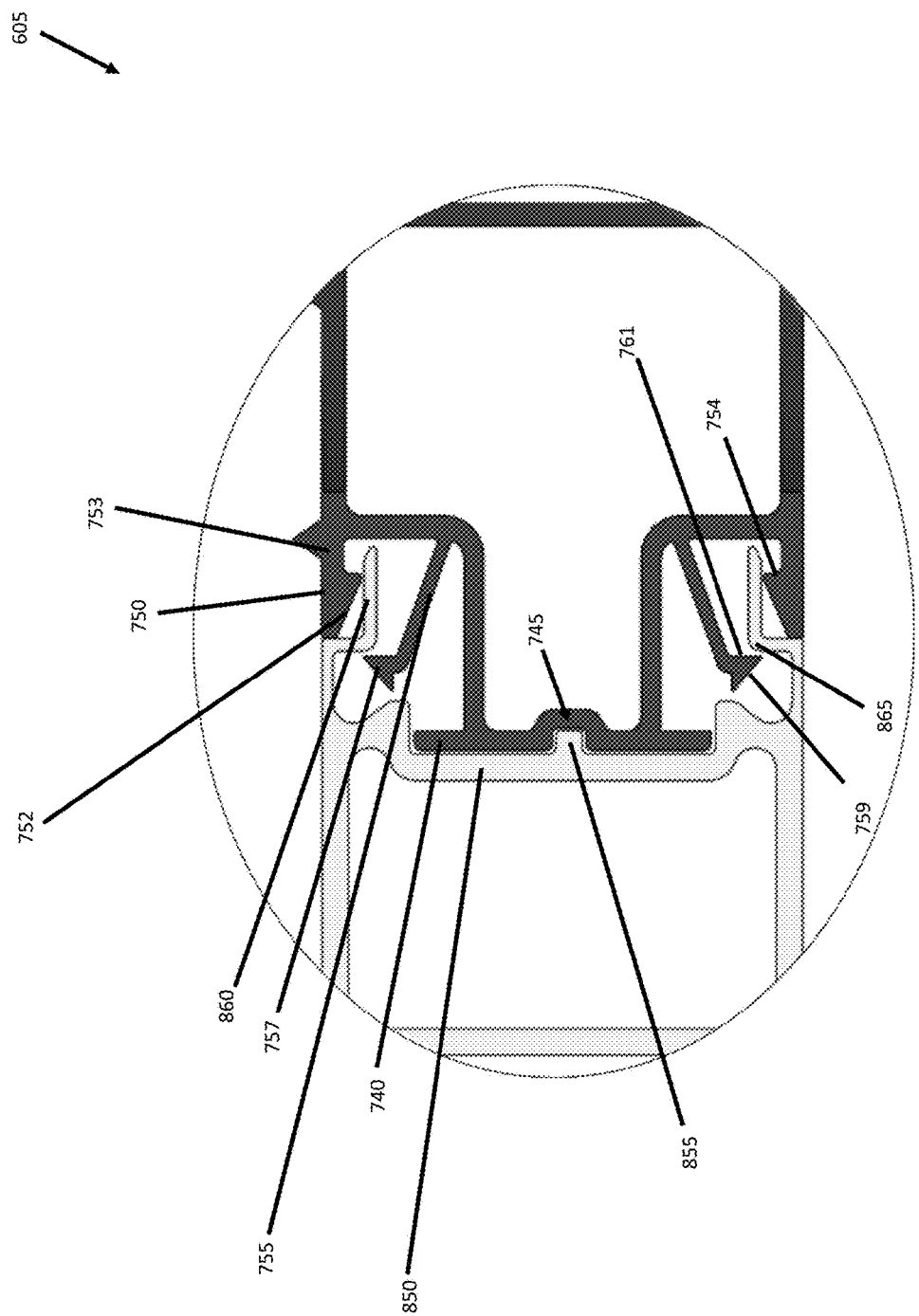
FIG. 10 is an expanded view of the first snap-fit of FIG. 9.

As illustrated in FIGS. 9 and 10, the male portion 730 of the lightweight panels 405 and the female portion 830 of the reinforced panels 410 are connected via the snap-fit connection. The male portion 730 and the female portion 830 are typically pushed together to engage the snap fit connection. The angled surface 752 of the connector arms 750 and the retention arm head 757 of the retention arms 755 allow for the connector guide 740 to be easily guided into the female portion 830. While the male portion 730 is pushed into the female portion 830, the retention arms 755 are flexed inward via contact with the receptacle tongues 860. During this time, the connector arms 750 are forced outwards to accommodate the receptacle tongues 860. The retention arm locking ledge 761 and receptacle locking bend 865 are able to snap together once the connector guide 740 has contacted the receptacle wall 850 and the receptacle post 855 has nested within the connector groove 745. The connector arm flex groove 753 enables the floor panels 205 to have small fluctuations in position without breaking. This creates a flooring system 112 that is more durable and able to withstand sudden fluctuations in applied force.

Once assembled, the connector guide 740 comes to rest against the connector arms 750. The connector groove 745 surrounds a portion of the receptacle post 855 and prevents rotation of the floor panels 205. Having a pair of connector arms 750 and retention arms 755 connected at the receptacle tongues 860 creates a strong snap-fit connection between the floor panels 205. As shown, the connector arms 750 are flush with the cargo surface 625 so that the cargo surface 625 are generally flat and smooth with the snap-fit connection. The integration of the receptacle post 855 into the connector groove 745 further allows the flooring system 112 to resist high forces in the event of a collision. Additionally, a level alignment of the floor panels 205 is maintained by the integration of the receptacle post 855 into the connector groove 745. It should be appreciated that the snap-fit connection allows for the installation of the flooring system 112 to be completed rapidly with little in the way of tools or experience with vehicle floor installation.

Figure 11:
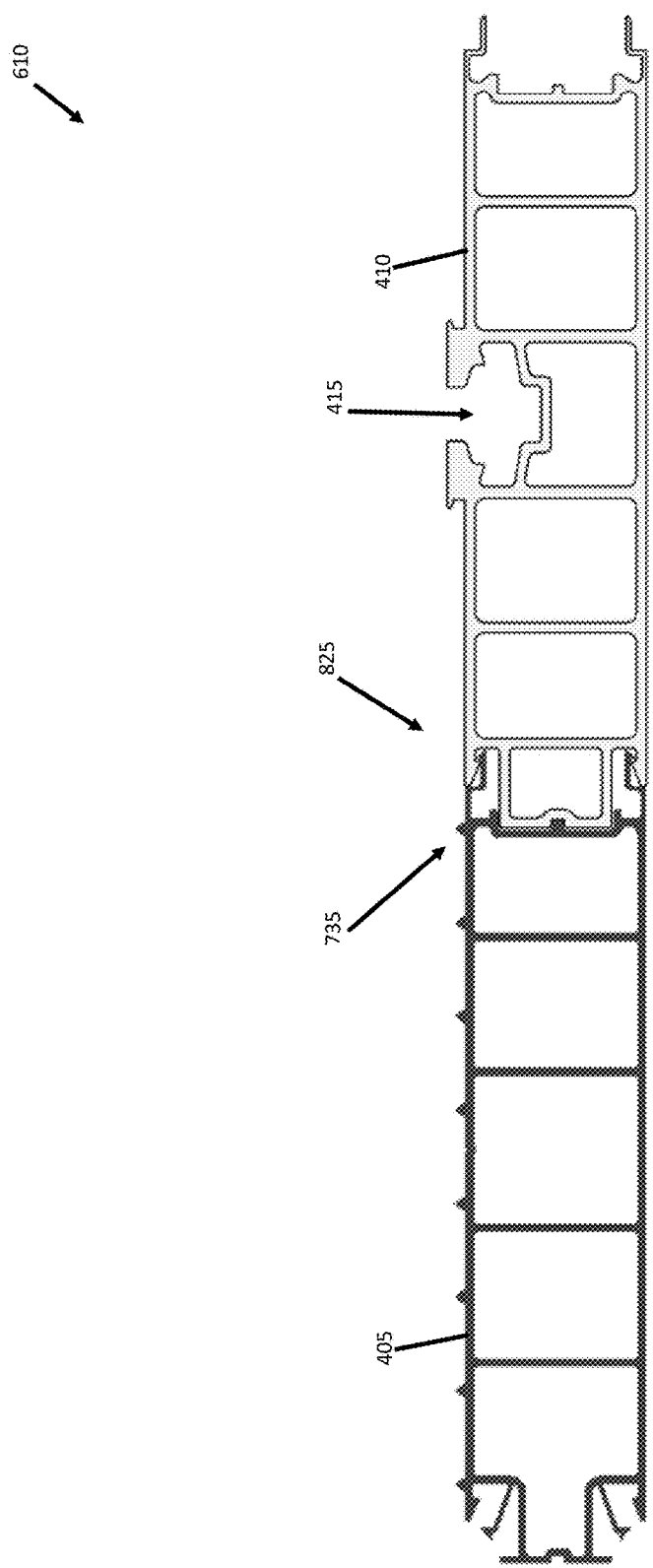
FIG. 11 is an enlarged end view of a second snap-fit between the lightweight panels and the reinforced panels.
Figure 12:
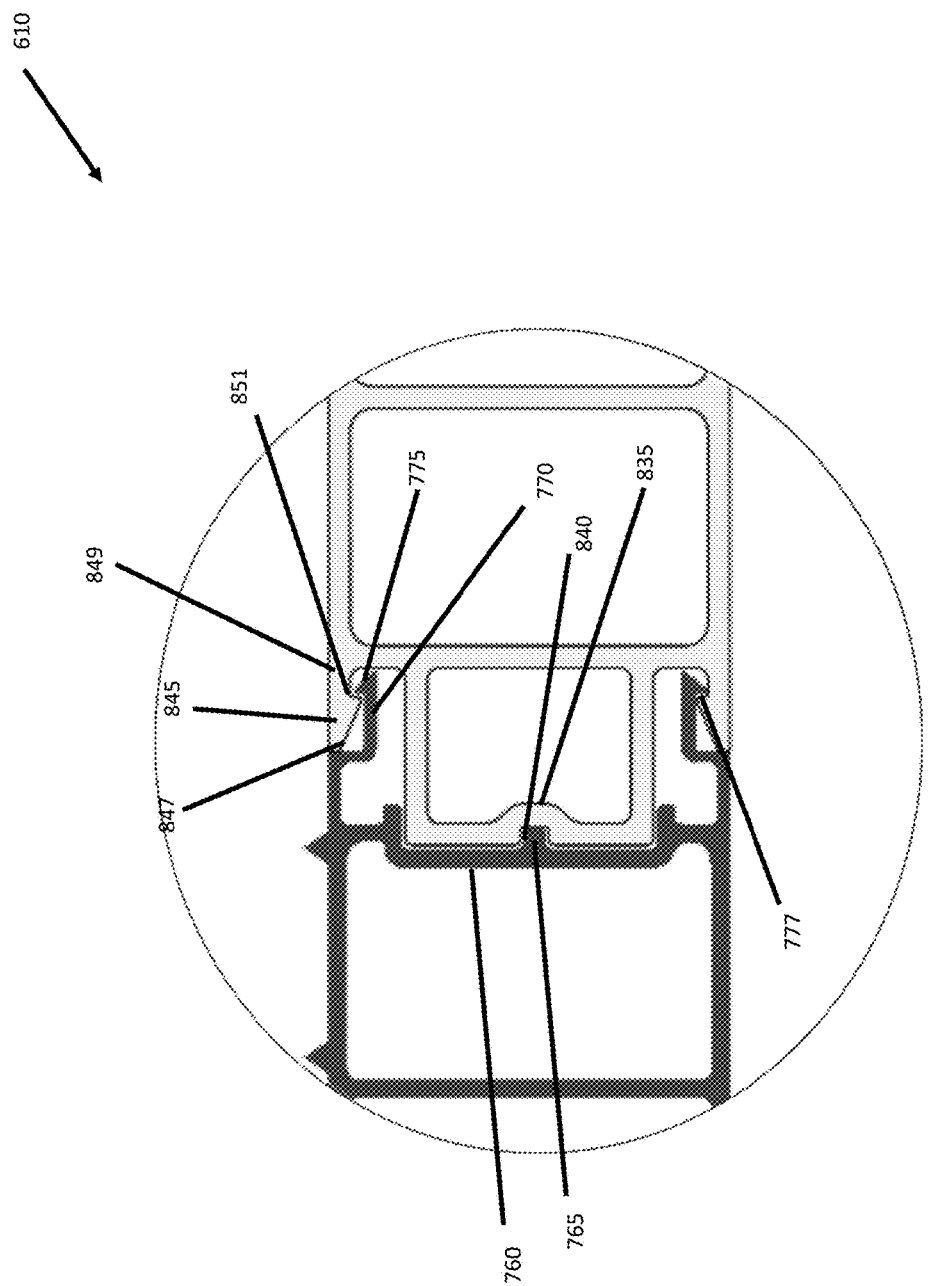
FIG. 12 is an expanded view of the second snap-fit of FIG. 11.

As illustrated in FIGS. 11 and 12, the female portion 735 of the lightweight panels 405 and the male portion 825 of the reinforced panels 410 are connected via the snap-fit connection. The female portion 735 and the male portion 825 are typically pushed together to engage the snap fit connection. The beveled edge 847 of the alignment arms 845 and the tongue chamfer 775 of the guide end tongues 770 allow for the alignment guide 835 to be easily guided into the female portion 735. While the male portion 825 is pushed into the female portion 735, the guide end tongues 770 are flexed inward and the alignment arms 845 are flexed outward via contact between the beveled edge 847 and the tongue chamfer 775. The locking lip 851 and tongue locking member 777 are able to snap together once the alignment guide 835 has contacted the guide end wall 760 and the guide end post 765 has nested within the alignment groove 840. The alignment arm flex groove 849 enables the alignment groove 840 to have small fluctuations in position without breaking. This creates a flooring system 112 that is more durable and able to withstand sudden fluctuations in applied force.

Once assembled, the alignment guide 835 comes to rest against the guide end wall 760. The alignment groove 840 surrounds a portion of the guide end post 765 and prevents rotation of the floor panels 205. Having a pair of alignment arms 845 and guide end tongues 770 connected creates a strong snap-fit connection between the floor panels 205. As shown, the alignment arms 845 are flush with the cargo surface 625 so that the cargo surface 625 are generally flat and smooth with the snap-fit connection. The integration of the guide end post 765 into the alignment groove 840 further allows the flooring system 112 to resist high forces in the event of a collision. Additionally, a level alignment of the floor panels 205 is maintained by the integration of the guide end post 765 into the alignment groove 840. It should be appreciated that the snap-fit connection allows for the installation of the flooring system 112 to be completed rapidly with little in the way of tools or experience with vehicle floor installation.

Figure 13:
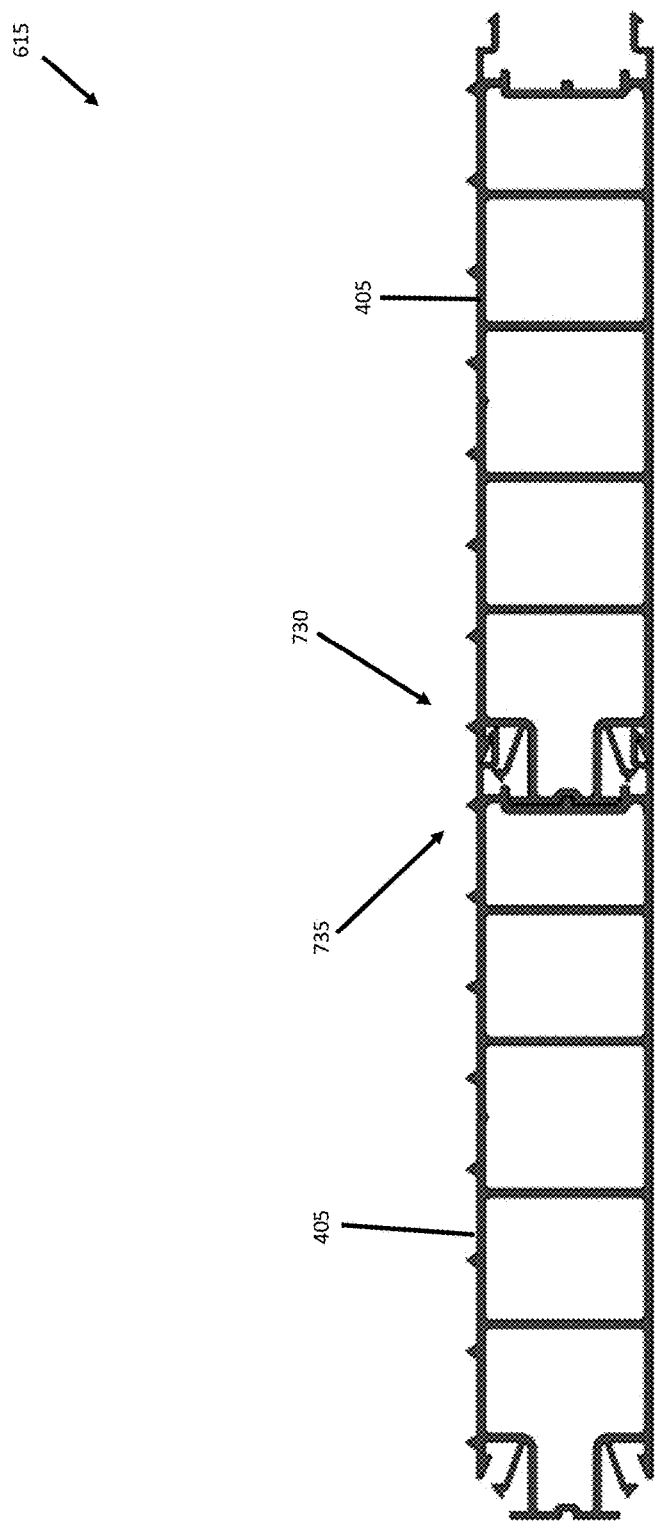
FIG. 13 is an enlarged end view of a third snap-fit between the lightweight panels.
Figure 14:
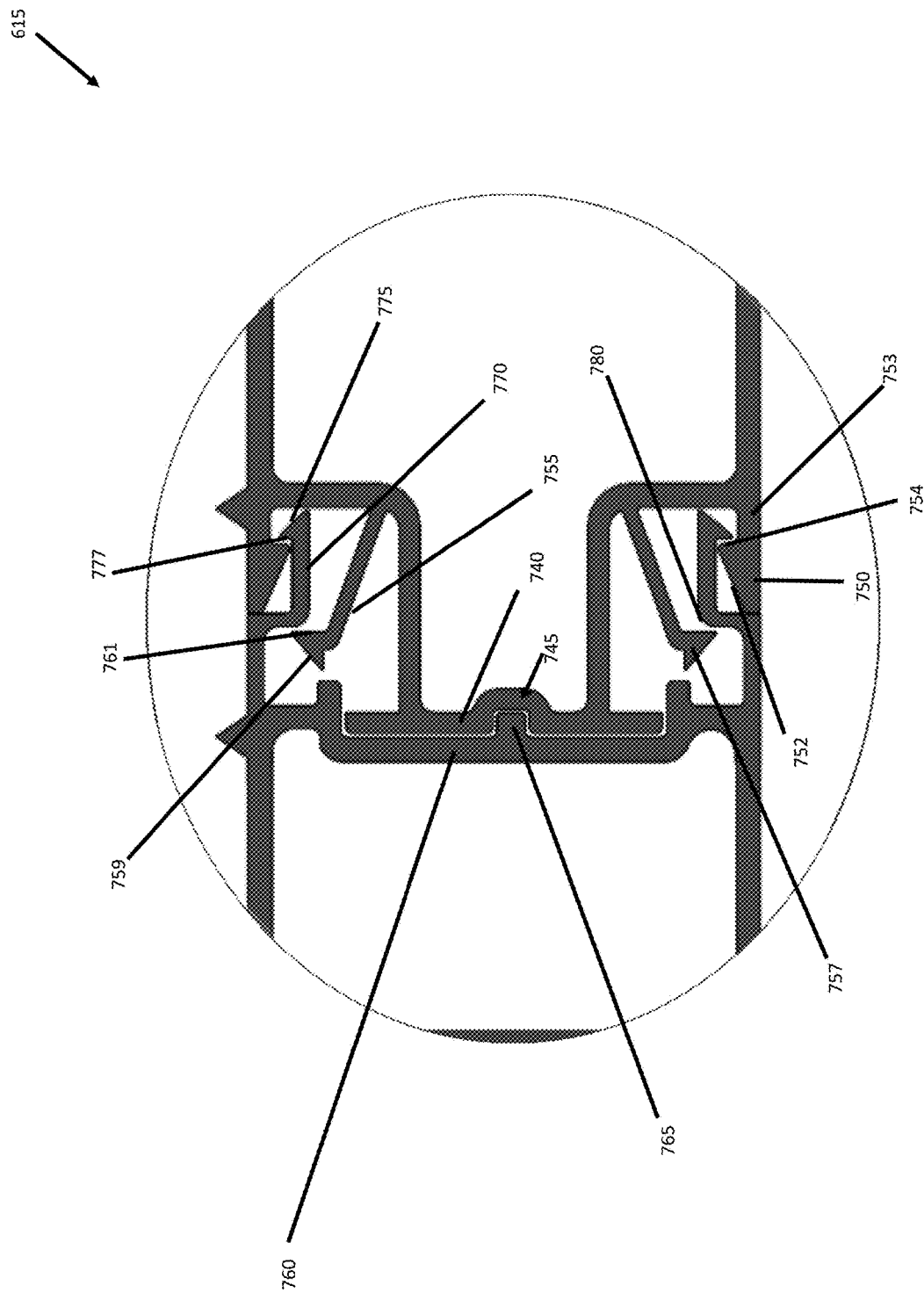
FIG. 14 is an expanded view of the third snap-fit of FIG. 13.

As illustrated in FIGS. 13 and 14, the male portion 730 of the lightweight panels 405 and the female portion 735 of the lightweight panels 405 are connected via the snap-fit connection. The male portion 730 and the female portion 735 are typically pushed together to engage the snap fit connection. The angled surface 752 of the connector arms 750, the tongue chamfer 775 of the guide end tongues 770, and the retention arm sloped edge 759 of the retention arms 755 allow for the connector guide 740 to be easily guided into the female portion 735. While the male portion 730 is pushed into the female portion 735, the retention arms 755 are flexed inward via contact with the guide end tongues 770. During this time, the connector arms 750 are forced outwards to accommodate the guide end tongues 770. The tongue locking member 777 and connector protrusion 754 are able to snap together once the connector guide 740 has contacted the guide end wall 760 and the guide end post 765 has nested within the connector groove 745. At this same time, the retention arm locking ledge 761 is able to snap around the tongue locking bend 780. The connector arm flex groove 753 enables the floor panels 205 to have small fluctuations in position without breaking. This creates a flooring system 112 that is more durable and able to withstand sudden fluctuations in applied force.

Once assembled, the connector guide 740 comes to rest against the guide end wall 760. The connector groove 745 surrounds a portion of the guide end post 765 and prevents rotation of the floor panels 205. Having a pair of connector arms 750 and retention arms 755 connected at the guide end tongues 770 creates a strong snap-fit connection between the floor panels 205. As shown, the connector arms 750 are flush with the cargo surface 625 so that the cargo surface 625 are generally flat and smooth with the snap-fit connection. The integration of the guide end post 765 into the connector groove 745 further allows the flooring system 112 to resist high forces in the event of a collision. Additionally, a level alignment of the floor panels 205 is maintained by the integration of the guide end post 765 into the connector groove 745. It should be appreciated that the snap-fit connection allows for the installation of the flooring system 112 to be completed rapidly with little in the way of tools or experience with vehicle floor installation.

Figure 15:
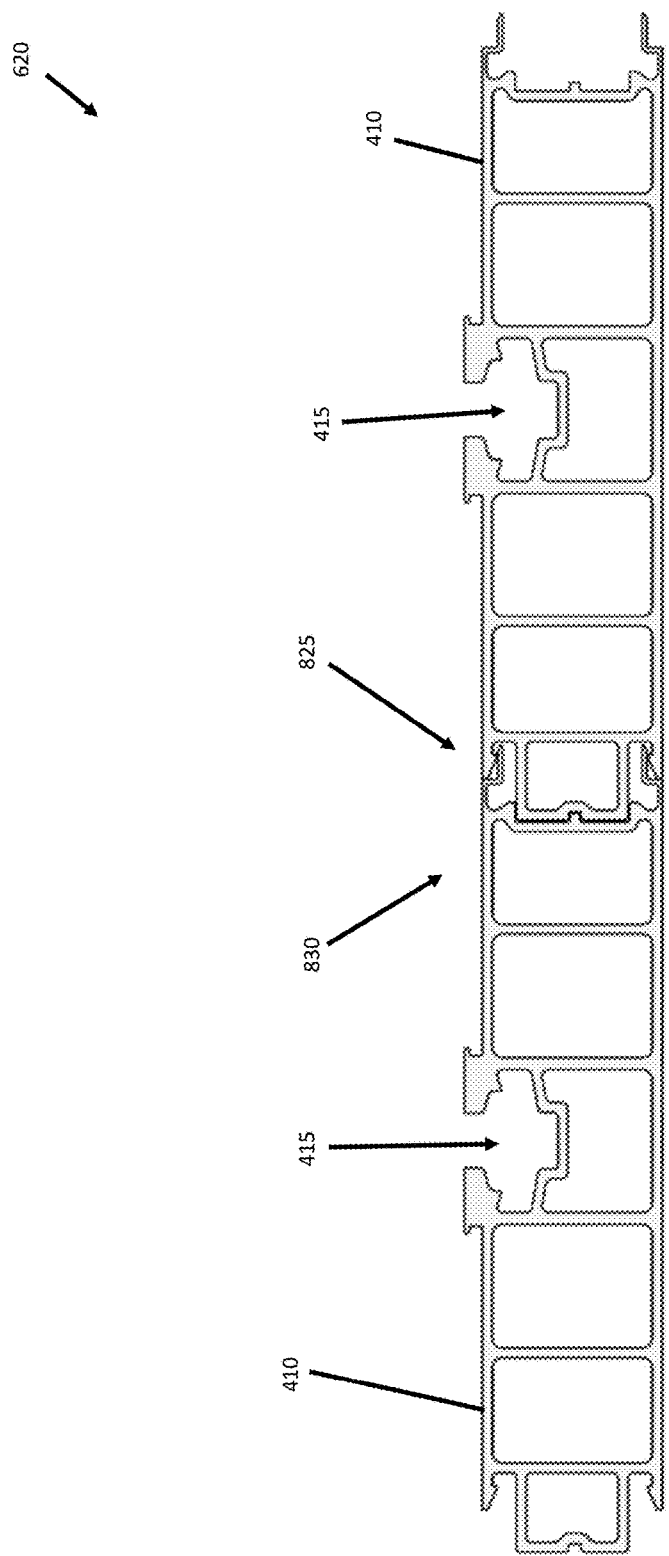
FIG. 15 is an enlarged end view of a fourth snap-fit between the reinforced panels.
Figure 16:
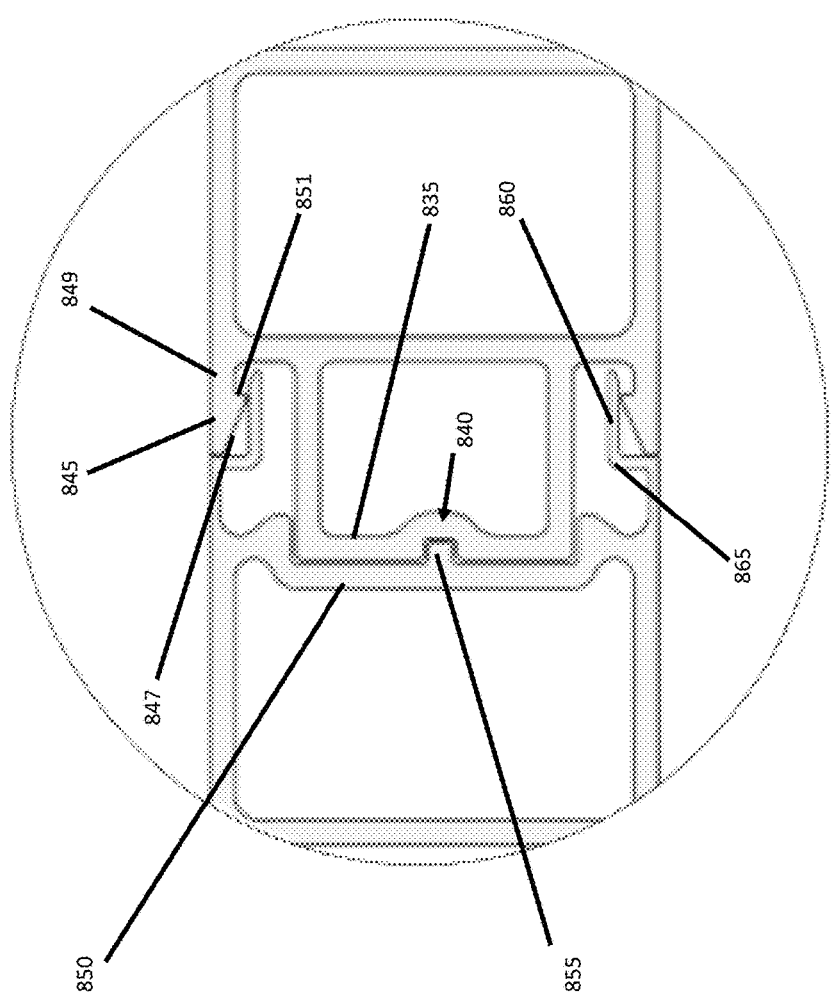
FIG. 16 is an expanded view of the fourth snap-fit of FIG. 15.

As illustrated in FIGS. 15 and 16, the male portion 825 of the reinforced panels 410 and the female portion 830 of the reinforced panels 410 are connected via the snap-fit connection. The male portion 825 and the female portion 830 are typically pushed together to engage the snap fit connection. The beveled edge 847 of the alignment arms 845 allow for the alignment guide 835 to be easily guided into the female portion 830. While the male portion 825 is pushed into the female portion 830, the alignment arms 845 are flexed outward via contact with the receptacle tongues 860. The locking lip 851 and receptacle tongues 860 are able to snap together once the alignment guide 835 has contacted the receptacle wall 850 and the receptacle post 855 has nested within the alignment groove 840. The alignment arm flex groove 849 enables the floor panels 205 to have small fluctuations in position without breaking. This creates a flooring system 112 that is more durable and able to withstand sudden fluctuations in applied force.

Once assembled, the alignment guide 835 comes to rest against the receptacle wall 850. The alignment groove 840 surrounds a portion of the receptacle post 855 and prevents rotation of the floor panels 205. Having a pair of alignment arms 845 connected at the receptacle tongues 860 creates a strong snap-fit connection between the floor panels 205. As shown, the alignment arms 845 are flush with the cargo surface 625 so that the cargo surface 625 are generally flat and smooth with the snap-fit connection. The integration of the receptacle post 855 into the alignment groove 840 further allows the flooring system 112 to resist high forces in the event of a collision. Additionally, a level alignment of the floor panels 205 is maintained by the integration of the receptacle post 855 into the alignment groove 840. It should be appreciated that the snap-fit connection allows for the installation of the flooring system 112 to be completed rapidly with little in the way of tools or experience with vehicle floor installation.

In another embodiment, the male portion 825 of the reinforced panels 410 and the female portion 830 of the reinforced panels 410 are connected via a connector component (not shown). For example, a user may place a plastic and/or rubber connector component between the male portion 825 and the female portion 830 to connect the male portion 825 and the female portion 830. As should be appreciated, the plastic connector component is used when the male portion 825 and the female portion 830 do not include a snap-fit connection. Additionally, the plastic connector component is used to reduce vibration and/or force felt by the flooring system 112 in the event of a crash and/or accident.

Figure 17:
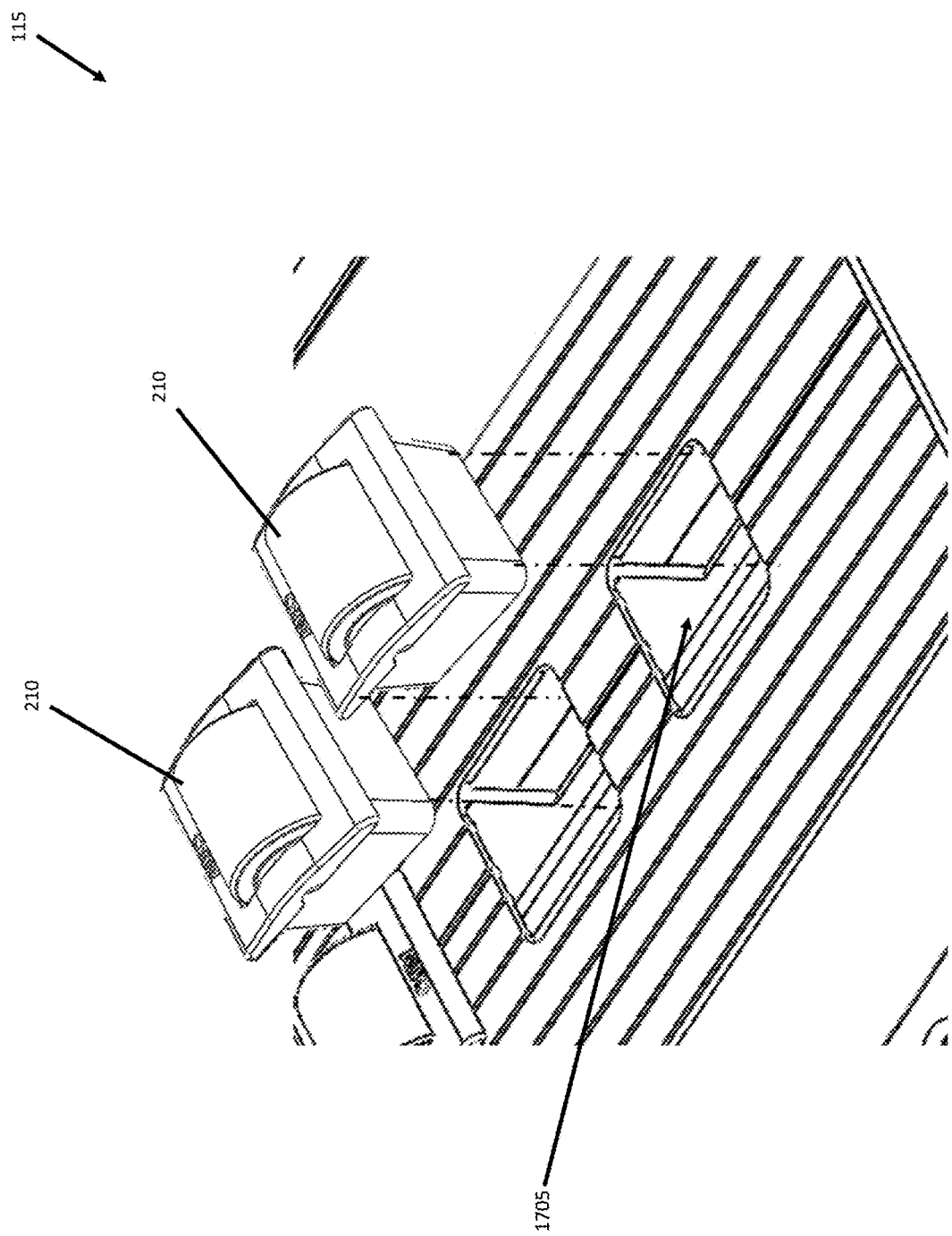
FIG. 17 is a perspective view of the floor including one or more rollers.

FIG. 17 shows an example of the rollers 210 used with the flooring system 112. The rollers 210 are generally placed in one or more openings 1705 defined by the floor panels 205. In one example, the openings 1705 are machined into the floor panels 205 after extrusion. For example, the openings 1705 are cut into the floor panels 205 via a computerized numeric control (CNC) machine. In other examples, the openings 1705 are cut into the floor panels 205 via torches, laser cutters, plasma cutters, hydro cutters, and/or any other device. As should be appreciated, each roller 210 has an individual opening 1705. The rollers 210 are configured to drop into the openings 1705 and protrude into the panel cavities 640 of the floor panels 205.

Figure 18:
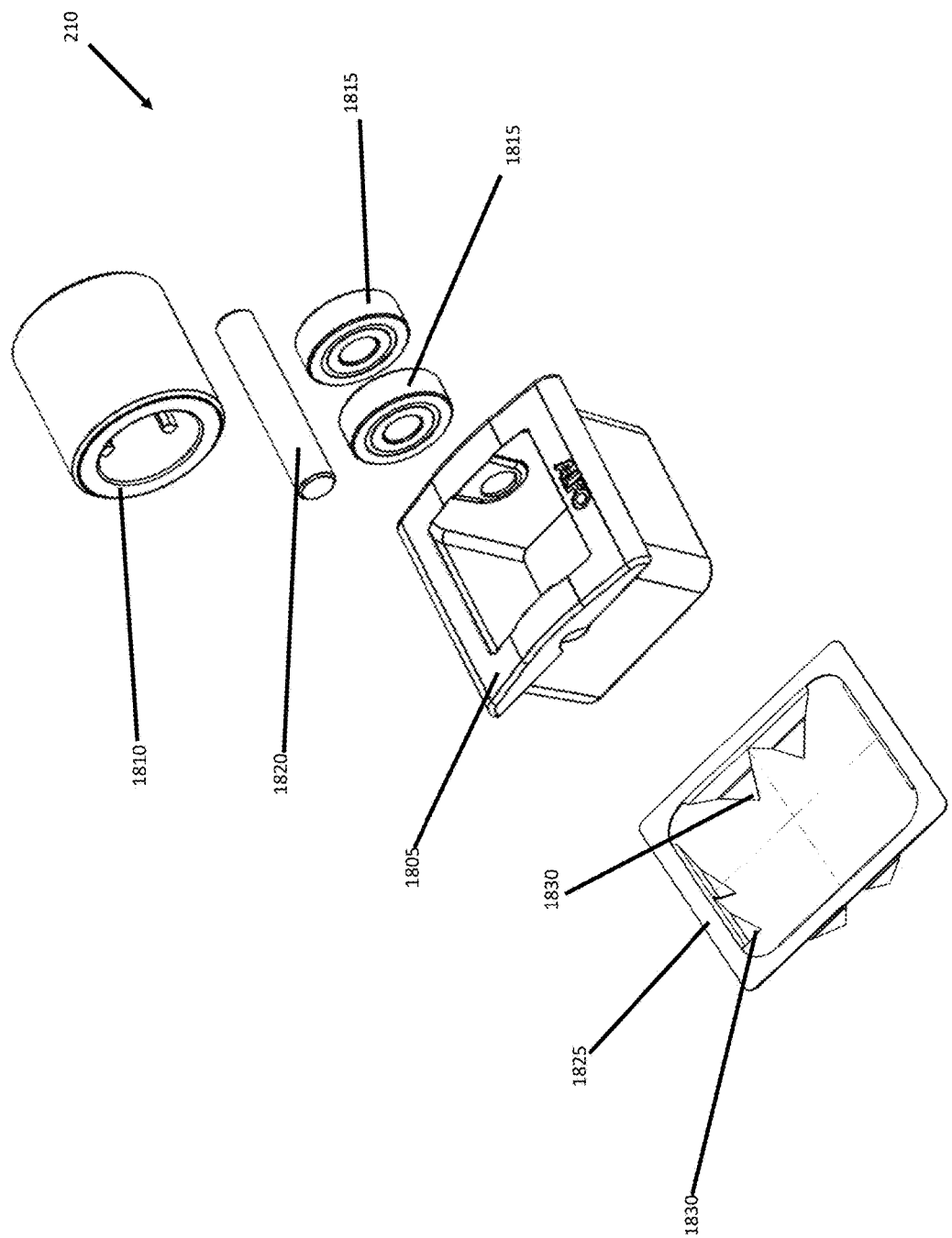
FIG. 18 is an exploded view of the rollers of FIG. 17.

FIG. 18 shows an exploded view of the rollers 210. The rollers 210 include a housing 1805 configured to hold a wheel 1810, one or more bearings 1815, and an axle 1820. In one example, the wheel 1810 is made from a metal and/or metallic material, such as steel. In another example, the wheel 1810 is made from a plastic and/or polymeric material to save weight. The bearings 1815 are configured to circumferentially mount on the axle 1820. The axle 1820 is configured to extend through the wheel 1810. As should be appreciated, the bearings 1815 are configured to enable rotational movement of the wheel 1810 with as little friction as possible. The axle 1820 is further configured to secure the wheel 1810 and the bearings 1815 within the housing 1805. For example, the axle 1820 mounts within the housing 1805 via a snap-fit connection. The rollers 210 further include a gasket 1825. The gasket 1825 is configured to surround the housing 1805 and secure the rollers 210 within the openings 1705. The gasket 1825 further includes one or more teeth 1830 configured to grip the housing 1805.

Figure 19:
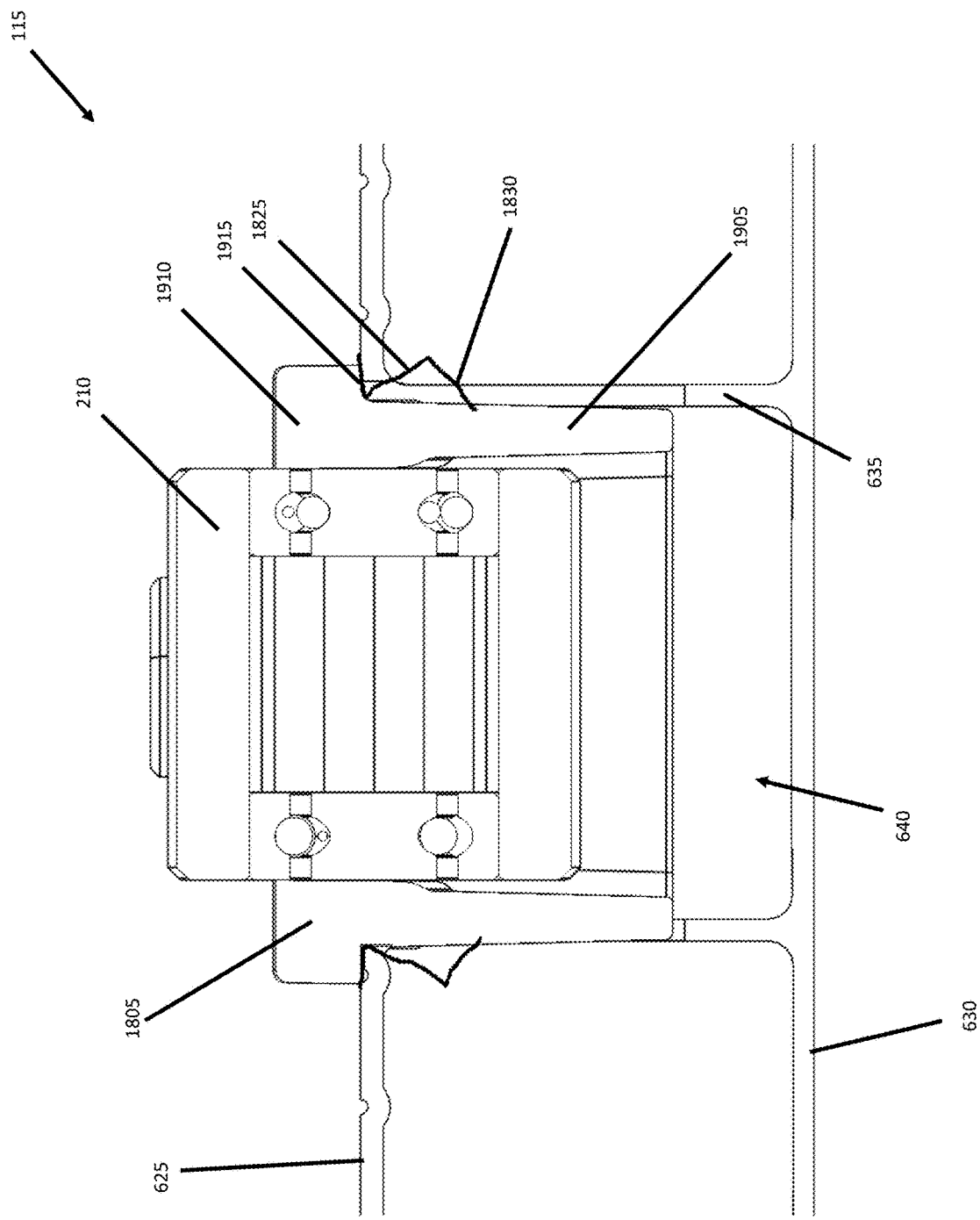
FIG. 19 is a partial cross-sectional view of the floor including the rollers.

As can be seen in FIG. 19, the rollers 210 extend through the openings 1705 and into the panel cavities 640 of the floor panels 205. The housing 1805 is shown to further include a body 1905 configured to extend through the openings 1705 and into the panel cavities 640. The body 1905 widens into a cap 1910 adjacent the wheel 1810 configured to prevent the rollers 210 from falling into the panel cavities 640. A flange 1915 rests against the cargo surface 625 of the floor panels 205 to align the rollers 210 within the openings 1705. As should be appreciated, the rollers 210 are suspended within the panel cavities 640 by the flange 1915 such that force applied to the rollers 210 is dispersed through the floor panels 205.

The rollers 210 are secured within the openings 1705 via the teeth 1830 of the gasket 1825. The teeth 1830 of the gasket 1825 are configured to bite and/or grab onto the body 1905 of the housing 1805 in order to prevent unwanted movement of the rollers 210 within the openings 1705. As should be appreciated, the gasket 1825 is generally made from a harder material than the housing 1805 so that the gasket 1825 is able to bite and/or grab onto the housing 1805. In one example, the gasket 1825 is made from metal and the housing 1805 is made from plastic.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example, if the stated value is 4.375, then use of the term "about 4.375" generally means a range between 3.9375 and 4.8125.

"Acute" or "Acute Angle" generally refers to an angle smaller than a right angle or less than 90 degrees.

"Adhesive" generally refers to any non-metallic substance applied to one or both surfaces of two separate parts that binds them together and resists their separation. For example, an adhesive can bond both mating surfaces through specific adhesion (e.g., molecular attraction), through mechanical anchoring (e.g., by flowing into holes in porous surfaces), and/or through fusion (e.g., partial solution of both surfaces in the adhesive or its solvent vehicle). Some non-limiting examples of adhesives include liquid adhesives, film adhesives, resin adhesives, rubber adhesives, silicone-based adhesives, mastics, metal-to-metal adhesives, plastic adhesives, rubber adhesives, sprayable adhesives, and hot melt adhesives, to name just a few.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Cargo" or "Cargo Items" generally refer to goods or other physical objects that are typically carried or otherwise transported on vehicles, such as on trucks, ships, aircraft, spacecraft, and/or motor vehicles. The cargo items can be unpackaged or packaged, such as in boxes, bags, bales, containers, barrels, and tanks, to name just a few examples.

"Cavity" generally refers to an empty space in a solid object. The cavity can be completely or partially surrounded by the solid object. For example, the cavity can be open to the surrounding environment.

"Channel" generally refers to a long, narrow groove in a surface of an object.

"Cross-sectional Area" generally refers to generally refers to the area of a non-empty intersection of a solid body in three-dimensional space with a plane. The shape of the cross-section of a solid may depend upon the orientation of the cutting plane to the solid. For example, while all the cross-sections of a ball are disks of varying diameters, the cross-sections of a cube depend on how the cutting plane is related to the cube. If the cutting plane is perpendicular to a line joining the centers of two opposite faces of the cube, the cross-section will be a square, however, if the cutting plane is perpendicular to a diagonal of the cube joining opposite vertices, the cross-section can be either a point, a triangle or a hexagon. A cross-section of a solid right circular cylinder extending between two bases is a disk if the cross-section is parallel to the cylinder's base, or an elliptic region if it is neither parallel nor perpendicular to the base. If the cutting plane is perpendicular to the base it consists of a rectangle unless it is just tangent to the cylinder, in which case it is a single line segment.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Female" generally refers to a structure that connects to another structure that includes hollow portions for receiving portions of a corresponding male connector.

"Flex Cage" generally refers to any structure that is part of a flex cell that that is capable of deformation and absorption of energy upon the application of a force. The flex cage may have any structure and may be made of any material that allows for deformation. Flex cages may be designed to be attached to a panel and may be attached either permanently to the panel or removably attached to the panel.

"Flex Groove" generally refers to a narrow indentation or notch in an object that allows the object to bend at the notch.

"Floor" generally refers to the flat base panel of a vehicle where the support structures are mounted. The floor can be made of many different materials such as wood, plastics, metals, rubbers, or a combination of materials. The floor may have tracks or mounting brackets for mounting support structures that are flush with the rest of the floor and/or protrude above the standard floor height. The floor of a vehicle is also the primary area for storage as that is where the items are set. For example, when loading the back of a van, the groceries are typically set on the floor. Additionally, the floor may be covered in a material to make it more comfortable. Some materials used may be carpet, rubber, metals, or leathers.

"Foot" generally refers to a structure that secures a support structure, like a seat, to a track channel of a flooring system.

"Housing" generally refers to a component that covers, protects, and/or supports another thing. A housing can have a unitary construction or made of multiple components. The housing can be made from the same material or a combination of different materials. The housing can include a protective cover designed to contain and/or support one or more mechanical components. Some non-limiting examples of a housing include a case, enclosure, covering, body, and shell.

"Load Deck" generally refers to one or more panels and/or assemblies of boards that form a face of a pallet on which goods and/or other items are carried. For examples, when boxes are stacked on a pallet, the first layer of boxes typically rests on the load deck of the pallet. Typically, but not always, the load deck is located on a side of the pallet that is opposite the support deck.

"Male" generally refers to a structure that connects to another structure that includes portions that fill or fit inside the hollow portion of a corresponding female connector.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other nonconductive material.

"Notch" generally refers to an indentation, cut, groove, channel, and/or incision on an edge or surface. In some non-limiting examples, the notch includes a V-shaped or U-shaped indentation carved, scratched, etched, stamped, and/or otherwise formed in the edge or surface. The notch can have a uniform shape or a non-uniform shape.

"Pallet" generally refers to a portable platform or other structure on which goods or items can be assembled, stacked, stored, packaged, handled, transported, and/or moved, such as with the aid of a forklift or pallet jack, as a unit load. Typically, but not always, the pallet is rigid and forms a horizontal base upon which the items rest. Goods, shipping containers, and other items are often placed on a pallet secured with strapping, stretch wrap, and/or shrink wrap. Often, but not always, the pallet is equipped with a superstructure. In one form, the pallet includes structures that support goods in a stable fashion while being lifted by a forklift, pallet jack, front loader, and/or other lifting devices. In particular, pallets typically include a top, load deck upon which items are stacked, a bottom, support deck that rests on the ground, and a spacer structure positioned between the load and support decks to receive the forks of the forklift or pallet jack. However, the pallets can be configured differently. For example, the term pallet is used in a broader sense to include skids that have no support deck. One or more components of the pallet, or even the entire pallet, can be integrally formed together to form a single unit. By way of non-limiting examples, these pallets can include stringer, block, perimeter, skid, solid deck, multiple deck board, panel-deck, slave, double-deck (or face), single-way entry, two-way entry, four-way entry, flush, single-wing, double-wing, expendable, limited-use, multiple-use, returnable, recycled, heat treated, reversible, non-reversible, and/or warehouse type pallets.

"Panel" generally refers to a flat or curved component that forms part of another object. Typically, but not always, the panel has a generally rectangular shape.

"Plastic" generally refers to a group of materials, either synthetic, semi-synthetic, and/or naturally occurring, that may be shaped when soft and then hardened to retain the given shape. Plastics are polymers. A polymer is a substance made of many repeating units. Plastics are generally insulators.

"Positive Lock" generally refers to a type fastening structure that is configured to remain secured even under vibratory or other loads.

"Retention Ledge" generally refers to a ledge, or narrow projecting surface, which serves the purpose of retaining an item. In one example, a retention ledge is configured to prevent food items from falling off of a tray. In another example, a retention ledge may surround a griddle surface to prevent food from falling onto the ground. A retention ledge may also serve as a backstop to assist a user in maneuvering food items onto a spatula or plate.

"Roller" generally refers to a device having a part configured to rotate in at least one direction to convey or otherwise move one or more objects. Typically, but not always, the roller is configured to provide a conveying surface and/or support for conveyed objects or other items. The roller can be powered or unpowered. The roller can have a variety of shapes. For instance, the roller can include cylindrical or ball type rollers.

"Snap Fastener" generally refers to a fastening device including a male portion and a female portion. The male portion typically includes a protrusion or ball on one component, while the female portion typically includes a recess or a socket configured to accept and secure the male portion. Typically, a snap fastener is mated together by a pushing force and separated by a pulling force.

"Snap-Fit Connector" or "Snap-Fit Connection" generally refers to a type of attachment device including at least two parts, with at least one of which being flexible, that are interlocked with one another by pushing the parts together. The term "Snap-Fit Connector" may refer to just one of the parts, such as either the protruding or mating part, or both of the parts when joined together. Typically, but not always, the snap-fit connector includes a protrusion of one part, such as a hook, stud, and/or bead, that is deflected briefly during the joining operation and catches in a depression and/or undercut in the mating part. After the parts are joined, the flexible snap-fit parts return to a stress-free condition. The resulting joint may be separable or inseparable depending on the shape of the undercut. The force required to separate the components can vary depending on the design. By way of non-limiting examples, the flexible parts are made of a flexible material such as plastic, metal, and/or carbon fiber composite materials. The snap-fit connectors can include cantilever, torsional, and/or annular type snap-fit connectors. In the annular snap-fit type connector, the connector utilizes a hoop-strain type part to hold the other part in place. In one form, the hoop-strain part is made of an elastic material and has an expandable circumference. In one example, the elastic hoop-strain part is pushed onto a more rigid part so as to secure the two together. Cantilever snap-fit type connectors can form permanent type connections or can be temporary such that the parts can be connected and disconnected multiple times. A multiple use type snap-fit connector typically, but not always, has a lever or pin that is pushed in order to release the snap-fit connection. For a torsional snap fit connector, protruding edges of one part are pushed away from the target insertion area, and the other part then slides in between the protruding edges until a desired distance is reached. Once the desired distance is reached, the edges are then released such that the part is held in place.

"Support Deck" generally refers to one or more panels and/or assemblies of boards that form a face of a pallet that typically (but not always) rests against another object, such as the floor, ground, other pallet, and/or other unit load, to carry the weight of the pallet and any load packed on the pallet. Typically, but not always, the support deck is located on a side of the pallet that is opposite the load deck. The support deck usually, but not always, includes one or more jack openings that allow pallet jack wheels to engage the floor and/or ground on which the support deck rests.

"Track" or "Seat Track" generally refers to a mechanical slide structure to which a support structure, such as a vehicle seat, is secured that allows horizontal repositioning or other movement of the support structure.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Wall Thickness" generally refers to the measured distance between the opposing outside surfaces of an object.

"Wheelchair" generally refers to a type of seat that is able to transport a person in a seated position. Typically, but not always, the seat includes one or more wheels that allow the seat to roll along the floor or ground. For example, there are powered wheelchairs in which the seat is propelled by batteries and an electric motor. Another example is manually-propelled wheelchairs where the force is either from the user rotating the wheels themselves (self-propelled) and/or an attendant pushing the chair from behind (attendant propelled).

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Part Reference Numbers | |
|---|---|
| 100 | vehicle |
| 105 | passenger cabin |
| 110 | cargo area |
| 112 | flooring system |
| 115 | floor |
| 120 | first end |
| 125 | second end |
| 205 | floor panels |

| Part Reference Numbers (continued) | |
|---|---|
| 210 | rollers |
| 215 | cargo |
| 220 | retention assembly |
| 405 | lightweight panels |
| 410 | reinforced panels |
| 415 | track channel |
| 505 | fasteners |
| 605 | first snap-fit |
| 610 | second snap-fit |
| 615 | third snap-fit |
| 620 | fourth snap-fit |
| 625 | cargo surface |
| 630 | support surface |
| 635 | ribs |
| 640 | panel cavities |
| 645 | ridges |
| 730 | male portion |
| 735 | female portion |
| 740 | connector guide |
| 741 | panel end wall |
| 742 | side guide walls |
| 743 | end guide wall |
| 744 | flanges |
| 745 | connector groove |
| 750 | connector arms |
| 752 | angled surface |
| 753 | connector arm flex groove |
| 754 | connector protrusion |
| 755 | retention arms |
| 757 | retention arm head |
| 759 | retention arm sloped edge |
| 760 | guide end wall |
| 761 | retention arm locking ledge |
| 765 | guide end post |
| 770 | guide end tongues |
| 775 | tongue chamfer |
| 777 | tongue locking member |
| 780 | tongue locking bend |
| 825 | male portion |
| 830 | female portion |
| 835 | alignment guide |
| 840 | alignment groove |
| 845 | alignment arms |
| 847 | beveled edge |
| 849 | alignment arm flex groove |
| 850 | receptacle wall |
| 851 | locking lip |
| 855 | receptacle post |
| 860 | receptacle tongues |
| 865 | receptacle locking bend |
| 1705 | openings |
| 1805 | housing |
| 1810 | wheel |
| 1815 | bearings |
| 1820 | axle |
| 1825 | gasket |
| 1830 | teeth |
| 1905 | body |
| 1910 | cap |
| 1915 | flange |

What is claimed is:

1. A vehicle flooring system, comprising:
a floor panel;
wherein the floor panel defines a panel cavity within the floor panel;
a roller is secured within the panel cavity via an opening in the floor panel; and
wherein the roller is secured within the panel cavity via a friction-fit.

2. The vehicle flooring system of claim 1, wherein the floor panel is extruded.

3. A vehicle flooring system, comprising:
a combination of one or more first floor panels and one or more second floor panels;

wherein the first and second floor panels are made from different materials;
wherein the first floor panels are made of aluminum;
wherein the first floor panels are extruded;
wherein each of the first floor panels define a panel cavity with an opening; and
wherein a roller is secured within the panel cavity via the opening.

4. A vehicle flooring system, comprising:
a combination of one or more first floor panels and one or more second floor panels;
wherein the first and second floor panels are made from different materials;
wherein the second floor panels are made of plastic;
wherein the first floor panels are extruded;
wherein each of the first floor panels define a panel cavity with an opening; and
wherein a roller is secured within the panel cavity via the opening.

5. A vehicle flooring system, comprising:
a floor panel;
wherein the floor panel defines a panel cavity within the floor panel;
a roller secured within the panel cavity via an opening in the floor panel; and
wherein the flooring system is secured to a vehicle floor via one or more fasteners through a support surface of the floor panel at only one end of the floor panel.

6. The vehicle flooring system of claim 4, wherein the second floor panels include one or more ridges on a cargo surface configured to increase grip on the cargo surface.

7. The vehicle flooring system of claim 3, wherein the floor panels have a track that defines a channel; wherein the channel is integral with the floor panel; and wherein the first floor panels are configured to secure one or more seats via the channel.

8. The vehicle flooring system of claim 1, wherein the floor panel is made of aluminum.

9. The vehicle flooring system of claim 1, wherein:
the floor panel has a track that defines a channel;
the channel is integral with the floor panel; and
the floor panel is configured to secure one or more seats via the channel.

10. The vehicle flooring system of claim 5, wherein the floor panel is made of aluminum.

11. The vehicle flooring system of claim 5, wherein:
the floor panel has a track that defines a channel;
the channel is integral with the floor panel; and
the floor panel is configured to secure one or more seats via the channel.

* * * * *

UNITED STATES PATENT AND TRADEMARK OFFICE
CERTIFICATE OF CORRECTION

PATENT NO. : 12,344,322 B2  
APPLICATION NO. : 17/658315  
DATED : July 1, 2025  
INVENTOR(S) : Anjani Kumar Page 1 of 1

It is certified that error appears in the above-identified patent and that said Letters Patent is hereby corrected as shown below:

In the Claims

Column 16, Line 59, Claim 1, replace "a roller is secured within the panel cavity via an opening" with --a roller secured within the panel cavity via an opening--

Signed and Sealed this  
Second Day of September, 2025

Coke Morgan Stewart  
*Acting Director of the United States Patent and Trademark Office*